United States Patent
Sheorey et al.

(10) Patent No.: US 12,094,175 B2
(45) Date of Patent: Sep. 17, 2024

(54) REAL-TIME CALIBRATION OF WIDE-BASELINE OUTSIDE-IN MULTI-CAMERA SYSTEMS

(71) Applicant: Intel Corporation, Santa Clara, CA (US)

(72) Inventors: Sameer Sheorey, Santa Clara, CA (US); Avinash Kumar, Santa Clara, CA (US); Michael Schmidt, Beaverton, OR (US); Abel Shin, Cypress, CA (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/103,295

(22) Filed: Nov. 24, 2020

(65) Prior Publication Data

US 2021/0082149 A1  Mar. 18, 2021

(51) Int. Cl.
| | |
|---|---|
| G06T 7/80 | (2017.01) |
| G06T 3/4007 | (2024.01) |
| H04N 13/20 | (2018.01) |
| H04N 23/695 | (2023.01) |
| H04N 23/90 | (2023.01) |

(52) U.S. Cl.
CPC .............. *G06T 7/85* (2017.01); *G06T 3/4007* (2013.01); *H04N 13/20* (2018.05); *H04N 23/695* (2023.01); *H04N 23/90* (2023.01)

(58) Field of Classification Search
CPC ..................... G06T 7/85; G06T 3/4007; G06T 2207/10021; G06T 2207/30221; G06T 2207/30241; H04N 13/20; H04N 23/695; H04N 23/90; H04N 17/002
See application file for complete search history.

(56) References Cited

PUBLICATIONS

Oracle Park, https://www.mlb.com/giants/ballpark.
Head Tracking Kits: Mo-Sys, retrieved online via https://www.mo-sys.com/product/camera-tracking/head-tracking-kits on Nov. 24, 2020.
"SynthEyes—Andersson Technologies LLC", retrieved online via https://www.ssontech.com on Nov. 12, 2020.
Alcantarilla, P.F. et al., "Fast Explicit Diffusion for Accelerated Features in Nonlinear Scale Spaces", British Machine Vision Conference (BMVC), Bristol, 2013.
Angeli, A. et al., "Fast and Incremental Method for Loop-Closure Detection Using Bags of Visual Words", IEEE Transactions on Robotics; Bd. 24; Nr. 5; pp. 1027-1037; 2008.
Bachmann, R. et al., "Motion Capture from Pan-Tilt Cameras with Unknown Orientation", 2019 International Conference on 3D Vision (3DV), 2019, 308-317.

(Continued)

*Primary Examiner* — Twyler L Haskins
*Assistant Examiner* — Angel L Garces-Rivera
(74) *Attorney, Agent, or Firm* — Hanley, Flight & Zimmerman, LLC

(57) ABSTRACT

Techniques related to calibration of wide-baseline outside-in multi camera systems are discussed. Such techniques include receiving video sequences and intrinsic parameters corresponding to each of the cameras in the system, generating first extrinsic parameters for the cameras using tracked features and the intrinsic parameters and second extrinsic parameters using location parameters corresponding to motion control systems coupled to the cameras, and combining the first and second extrinsic parameters to provide real-time calibration of extrinsic parameters for the cameras.

25 Claims, 11 Drawing Sheets

(56) References Cited

PUBLICATIONS

Chen, J. et al., "Sports Camera Calibration via Synthetic Data", IEEE/CVF Conference on Computer Vision and Pattern Recognition Workshops (CVPRW); Long Beach CA, USA; IEEE 2019 ISBN 978-1-72812-506-0; S. 2497-2504; 2019.
Citraro, L. et al., "Real-Time Camera Pose Estimation for Sports Fields", Machine Vision and Applications Bd. 31 (2020), Nr. 3, S. 16, arXiv:2003.14109.
Fischler, M. et al., "Random Sample Consensus: A Paradigm for Model Fitting with Applications to Image Analysis and Automated Cartography", Communications of the ACM; vol. 24, No. 6, Jun. 1981, pp. 381-395.
Hartley, R. et al., "Multiple View Geometry in Computer Vision", Hartley and Zisserman, book title: Multiple View Geometry in computer vision, Chap. 4 title: Estimation-2D Projective Transformations, Cambridge Univ. Press (2003) (53 pages).
Jiang, W. et al., "Optimizing Through Learned Errors for Accurate Sports Field Registration", arXiv:1909.08034 [cs] (2020).
Levi's Stadium, "Home of the San Francisco 49ers", https://www.levisstadium.com/abgerufen am Jul. 9, 2020.
Lowe, David G., "Distinctive Image Features from Scale-Invariant Keypoints", International Journal of Computer Vision, 2004, pp. 1-28.
Lu, J. et al., "Pan-tilt-zoom SLAM for Sports Videos", arXiv:1907.008816 [cs] (2019).
Markley, F.L. et al., "Averaging quaternions", Journal of Guidance, Control, and Dynamics Bd. 30 (2007), Nr.4,S.1193-1197.
Menegaz, H. et al., "A Systematization of the Unscented Kalman Filter Theory", IEEE Transactions on Automatic Control Bd. 60 (2015), Nr. 10, S. 2583-2598.
Mur-Artal, et al., "Orb-slam2: An open-source slam system for monocular, stereo, and rgb-d cameras", IEEE Transactions on Robotics 33.5, pp. 1255-1262 (2017).
Puwein, J. et al., "Robust multi-view camera calibration for wide-baseline camera networks", 2011 IEEE Workshop on Applications of Computer Vision (WACV); IEEE, 2011, S. 321-328.
Redspy, "Optical Tracking system of the Future. And Present.", stYpe; cutting edge camera tracking technology for live broadcast or film; retrieved online via https://stype.tv on Nov. 12, 2020.
Shi, J. et al., "Good features to track", Cornell University; 1993.
SolidTrack, "What is SolidTrack? SolidTrack The Innovative Markerless Camera Tracking System", retrieved online via http://www.solid-track.com/solidtrack-vfx/article/what-is-solidtrack on Nov. 12, 2020.
StarTracker, "Camera Tracking, Optical Tracking, Real Time Camera Tracking System", retrieved online via https://www.mo-sys.com/product/camera-tracking/startracker on Nov. 12, 2020.
StypeKit, "Achieve Augmented Reality with your existing crane!", retrieved online via https://stype.tv/stype-kit on Nov. 12, 2020.
Szeliski, R. et al., "Creating full view panoramic image mosaics and environment maps", Proceedings of the 24th annual conference on computer graphics and interactive techniques; SIGGRAPH '97; ACM Press, 1997.
Tsai, R.Y. et al., "A new technique for fully autonomous and efficient 3D robotics hand/eye calibration", IEEE Transactions on Robotics and Automation Bd. 5 (1989), Nr. 3, S. 345-358.
Wan, E.A. et al., "The unscented Kalman filter for nonlinear estimation", Adaptive Systems for Signal Processing, Communications, and Control Symposium; 2000.

f = 54 mm
Subject Distance = 24.1 m
Background Distance = 24.4 m f = 35 mm
Subject Distance = 15.6 m
Background Distance = 15.9 m

REAL-TIME CALIBRATION OF WIDE-BASELINE OUTSIDE-IN MULTI-CAMERA SYSTEMS

BACKGROUND

Calibrating multi-camera systems such as those implemented to monitor large scale spaces (e.g., athletics, soccer games, football games, basketball games in large stadiums, etc.) is important to the development of related applications such as computer vision applications, machine learning applications, and more. Such applications are important to a variety of technologies that are of interest to viewers including generating video analytics such as speed, stride length, jump height, etc. in live sports broadcasts and generating stay-at-home immersive experiences via virtual reality (VR) or augmented reality (AR) enabled devices. Such analytics provide spectators with an in-depth understanding of athlete abilities and such immersive experiences provide viewers new and interesting aspects of a viewing experience.

Current multi-camera system calibration includes field registration where calibration is defined as being able to register broadcast images to a 2D planar field. If real control points (e.g. corners on a playing court) are given on the 2D field and corresponding image control points are known a-priori, homography based methods can be used to register all the cameras to one global coordinate frame on the playing field. Such techniques may use feature detection and matching of features and pose between cameras. To remove manual selection of 2D field-2D image correspondence, deep learning can be applied to directly learn the homography and register images or a learning framework to learn 2D-2D correspondence may be developed to compute camera focal length, rotation and translation for a sequence of frames.

Other techniques include multi-camera pan-tilt-zoom setup where multi-camera extrinsics are determined by first detecting 2D body keypoints from multiple views and optimizing the 3D pose over relative rotation between cameras. The relative rotations can be constrained to follow a single viewpoint condition where the respective rotations of each camera follow a homography. In visual effects applications, match-moving may be used for optical camera tracking. Typically, visual features and bundle adjustment techniques are used. Other camera tracking systems use sensors. In mobile robotics and autonomous driving, visual odometry and simultaneous localization and tracking (SLAM) techniques using sensor fusion may be employed.

However, such techniques suffer from a variety of difficulties and constraints including limitations when cameras are mounted to motion control systems, the inability to provide calibration in real-time, the inability to provide calibration in contexts where narrow field of view cameras are implemented due to the lack of distinctive image features, inaccuracy when relying on inertial measurement unit sensors, limitations due to vibrations and other movements in the environment (e.g., due to wind), limitations when cameras are all pointing outside-in, limitations and failures when cameras are employed with a wide baseline, and others.

It is desirable to provide highly accurate and real-time capable calibration of wide-baseline outside-in multi-camera systems to improve the performance of related applications. It is with respect to these and other considerations that the present improvements have been needed. Such improvements may become critical as the desire to provide in-depth and immersive experiences for viewers becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
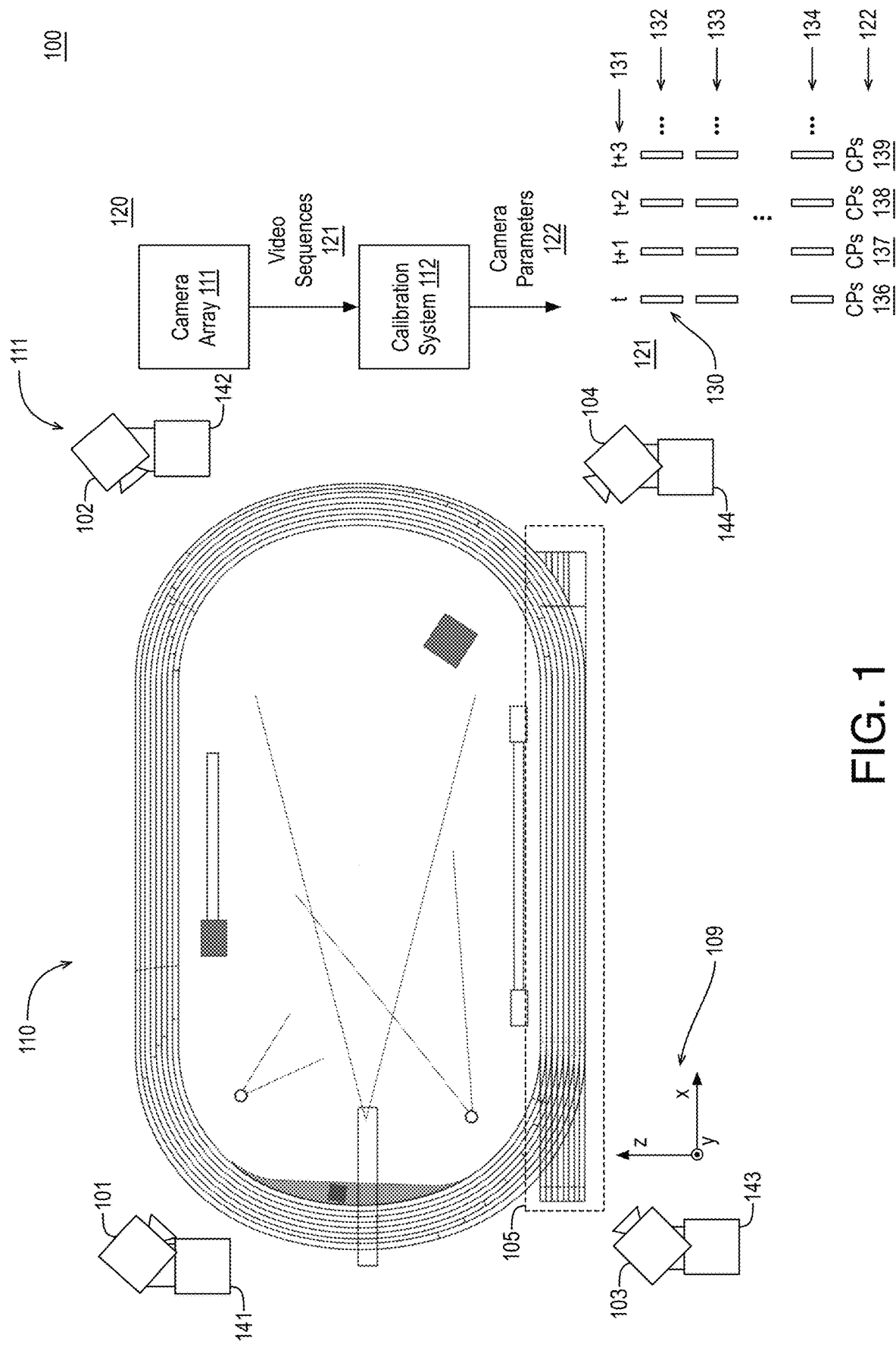
FIG. 1 illustrates an example wide-baseline outside-in multi-camera system employed in an example context to view a scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to calibration of wide baseline outside in multi-camera systems.

As described above, it is advantageous to perform high accuracy and real-time capable calibration of wide-baseline outside-in multi-camera systems. Herein, techniques for calibrating a multi-camera setup that is typical for monitoring events in large-scale spaces (e.g. athletics, soccer, football, basketball in large stadiums, etc.) are discussed. Although illustrated and discussed herein in some contexts as related to sporting events, the techniques discussed herein may be employed in relation to any scene. The discussed calibration system may be characterized as a moving camera calibration (MCC) system. Accurate calibrations using the techniques discussed herein provide for the improvement and development of various applications including computer vision applications, machine learning applications, and others. Such applications may be employed in the contexts of generating video analytics such as speed, stride length, jump height, etc. in live sports broadcasts, generating stay-at-home immersive experiences in virtual reality (VR) or augmented reality (AR) devices, and others.

The multi-camera system or setup in the contexts discussed herein has one or more of the following properties, which provide difficulties for traditional multi-camera calibration techniques. In some embodiments, one or more cameras of the multi-camera system is mounted on a motion control system (MCS) such as a fixed pan tilt unit (PTU) or moving on rails, or both. Furthermore, such cameras may be fitted with zoom lenses. Notably, the changing zoom makes intrinsic calibration a constantly changing quantity. As used herein, the term moving multi-camera system indicates a multi-camera system where at least one camera is mounted on a motion control system to rotate the camera in one or more of yaw, pitch, or roll and/or to translate the camera by any amount during video recording. In some embodiments, all cameras of the multi-camera system are pointing outside-in and are each imaging a specific part of a 3D scene (e.g. tracking athletes as they run). Such configurations also cause extrinsic calibration to change over time thus requiring them to be recomputed in real-time. As used herein, the term outside-in multi-camera system indicates a multi-camera system where all cameras are pointing outside-in at a scene. In some embodiments, the angle subtended by the baseline connecting neighboring cameras of the multi-camera system trained on the common 3D scene is large (e.g., not less than 70° and up to about 150°). Such wide-baselines cause large perspective changes in the commonly imaged scene rendering self-calibration methods relying on feature matching unusable. As used herein, the term wide-baseline multi-camera system indicates a multi-camera system where at least one pair of cameras (and in some cases all pairs of cameras) have an angle subtended by the baseline connecting the pair of cameras is not less than 70°.

In addition to calibration difficulties provided by the physical setup of the multi-camera system, other calibration challenges arise from real world calibration application. For example, as the cameras perform frame-synchronized video capture of action in a scene, the relative extrinsics need to be determined in real-time at a particular video rate (e.g., 60 fps) to enable real-time accurate analytics generation. In open environments, the cameras are prone to small vibrations due to wind, structural deformation, instability of the platform, which also require real-time extrinsic calibration.

The cameras may also be fitted with telephoto lenses that provide high magnification of the scene. Live video is captured from the cameras and used for multi-view computer vision, artificial intelligence (AI) applications such as 3D human skeleton tracking, activity analysis or tracking, and analysis of small objects. Small errors in calibration in image pixels can lead to large errors in actual metric 3D units and therefore highly accurate camera calibration (with an angular error in the range 0.01° to 0.1°) is needed. Furthermore, while, in most cases, intrinsic camera parameters can be determined offline, zoom cameras can change zoom during video capture and thus require an online computation of intrinsic parameters.

Techniques discussed herein provide a multi-camera calibration system that may include offline and online components that overcome such difficulties to generate accurate calibration parameters in real-time contexts. Such parameters may be used to triangulate the 3D body keypoints of athletes in a 3D athlete tracking system, which allows generation of various biomechanical metrics (e.g. athlete stride length through a race), and for many other applications. In some embodiments, video sequences are received one each from a camera in a camera array. The video sequences each include frames that are attained for the same time instances across the frames. Furthermore, intrinsic parameters for each of the cameras are received such that the intrinsic parameters may include parameters that are determined during offline training and/or parameters that are determined in real-time. As used herein, the term offline indicates a time that is prior to an event that is to be processed and real-time indicates processing during the event. The event may be any suitable event such as a sporting contest, a concert, a political event or any other event where wide-baseline outside-in multi-camera systems are employed. As used herein, the term intrinsic parameters indicates those parameters particular to the workings of the camera such as focal length, optical center, distortion or the like, which can be contrasted with extrinsic parameters, which indicate the orientation and location of the camera within a scene.

As discussed further herein, a set of extrinsic parameters are generated for each camera in the camera array and for each time instance of the video sequences. Such extrinsic parameters are used in a variety of image processing, artificial intelligence, artificial reality, virtual reality, or other contexts. Such extrinsic parameters indicate the location (x, y, z) and orientation (yaw, pitch, roll or quaternion parameters) of each camera. In some embodiments, such extrinsic parameters are generated based on tracking features in the video sequences to generate visual odometry based extrinsic parameters and combining the visual odometry based extrinsic parameters with motion control system based extrinsic parameters generated using motion parameters corresponding motion control systems coupled to (and optionally moving) corresponding cameras of the multi-camera system. Such visual odometry based and motion control system based extrinsic parameters may be combined using any suitable technique or techniques such as weighted averaging, application of an unscented Kalman filter, or the like. The resultant extrinsic parameters for each camera and time instance are then output for use as discussed. For example, the discussed wide-baseline multi-camera calibration techniques provide accurate real-time extrinsic calibration for moving cameras mounted on a motion control system as metadata in a video stream. The multi-view video streams may be processed based on calibration parameters to obtain various high-level statistics like 3D athlete poses, speed and other bio-mechanical metrics.

In addition, or in the alternative, a variety of offline and real-time calibration techniques for wide-baseline outside-in multi-camera systems are discussed. In some embodiments, an offline survey of the scene provides initial static intrinsic and extrinsic calibration for each camera and, during live operation, as the camera is moving, position and orientation of the cameras are re-determined by combining or fusing information from the motion control system sensors (e.g., wheel encoders) and the visual image features present in the current view. The wide-baseline multi-camera calibration discussed herein provides the necessary high quality and real-time calibration needed for highly accurate 3D reconstruction of large and dynamic scenes for applications such as live broadcast of sports and cultural events, fast post-production for visual effects in movies and video games such as eSports, and others.

FIG. 1 illustrates an example wide-baseline outside-in multi-camera system 120 employed in an example context 100 to view a scene 110, arranged in accordance with at least some implementations of the present disclosure. As shown in FIG. 1, system 120 includes a camera array 111 and a calibration system 112. As shown, camera array 111 of system 120 attains video sequences 121 for offline and real-time processing by calibration system 112. It is noted that calibration system 112 may also receive other data and data structures from motion control system (MCS), camera array 111, and other sources for calibration purposes. In some embodiments, one or more of cameras 101, 102, 103, 104 are mounted to a corresponding MCS 141, 142, 143, 144 to provide rotational and/or translation motion of cameras 101, 102, 103, 104. MCSs 141, 142, 143, 144 may be any suitable motion control system such as pan tilt units (PTU), motion tracks, or combinations of those systems and others. System 120 or components thereof may be implemented via any suitable device or devices such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

As shown, cameras 101, 102, 103, 104 may be provided around a scene 110 having a world coordinate system 109 applied thereto. Scene 110 is illustrated as a track and field event with an event of interest 105 illustrated as a sprint event. However, scene 110 may be any suitable event having any number and types of event of interest 105. In the illustrated example four cameras 101, 102, 103, 104 are provided, however any number may be used. Cameras 101, 102, 103, 104 attain video sequences 121 such as video sequence 132, video sequence 133, and video sequence 134 that each have a number of frames such as frame 130 video sequence 132 that are attained for particular time instances of time instances 131. Notably, for a particular time instance, t, each video sequence has a corresponding frame, for time instance t+1, each video sequence has a corresponding frame, and so on such that video sequences 121 each include a number of frames of scene 110 sequenced along shared time instances 131 within a particular range of error. Furthermore, such frames and time instances may be synchronized as discussed further herein. Calibration system 112 generates, for each of time instances 131, camera parameters 122 as shown with respect to camera parameters (CPs) 136 for time instance t, camera parameters 137 for time instance t+1, camera parameters 138 for time instance t+2, camera parameters 139 for time instance t+3, and so on. Camera parameters 122 may include intrinsic and/or extrinsic camera parameters updated along time instances 131. For example, extrinsic parameters may be updated at each of time instances 131 while intrinsic parameters may be updated occasionally or not at all after offline calibration.

Figure 2:
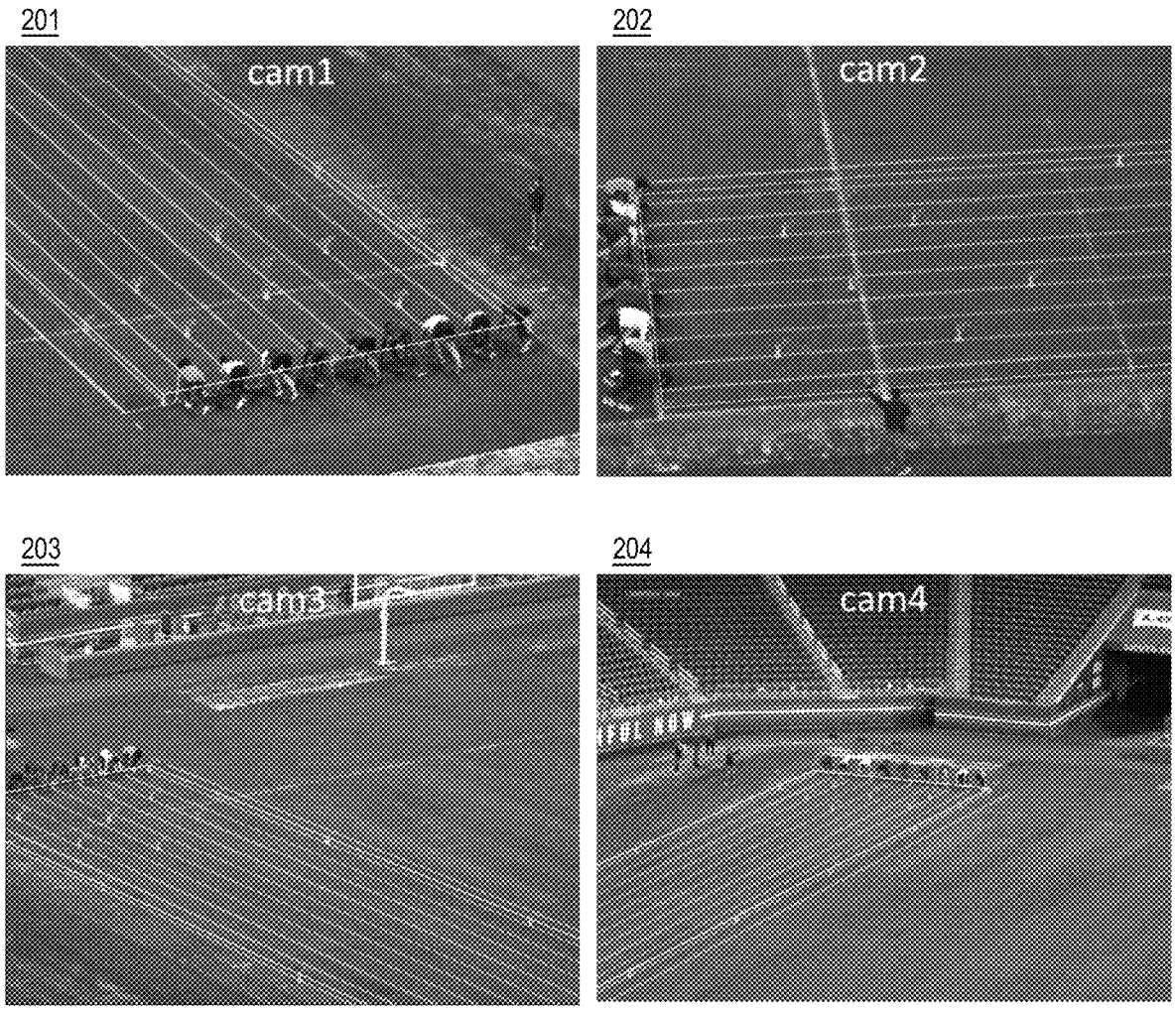
FIG. 2 illustrates example frames obtained by a camera array of a wide-baseline outside-in multi-camera system.

FIG. 2 illustrates example frames 201, 202, 203, 204 obtained by camera array 111 of wide-baseline outside-in multi-camera system 120, arranged in accordance with at least some implementations of the present disclosure. Frames 201, 202, 203, 204 show static images of synchronized video frame capture. As used herein, the terms contemporaneous, simultaneous, or synchronized, and similar terms with respect to video frames indicates video frames that are synchronized at the same or nearly the same time instance within a tolerance such as 8 ms (e.g., half the frame interval). As shown, the wide baseline between cameras 101, 102, 103, 104 (i.e., pairs of cameras having an angle subtended by the baseline connecting the pair of cameras of not less than 70°) results in the ability of camera array 111 to image different sides of event of interest 105 of scene 110 with fewer cameras but at the cost of increasing complexity of feature matching between frames 201, 202, 203, 204. As discussed, computer vision applications and others require intrinsic camera parameters for each of cameras 101, 102, 103, 104 and real-time extrinsic camera parameters as cameras move their respective MCSs 141, 142, 143, 144. To attain high accuracy and real-time camera parameters, calibration system 112 performs offline calibration to generate intrinsic camera parameters and relative translation between the cameras and a real-time or online procedure to determine relative rotation and/or translation between cameras as provided by extrinsic camera parameters.

Figure 3:
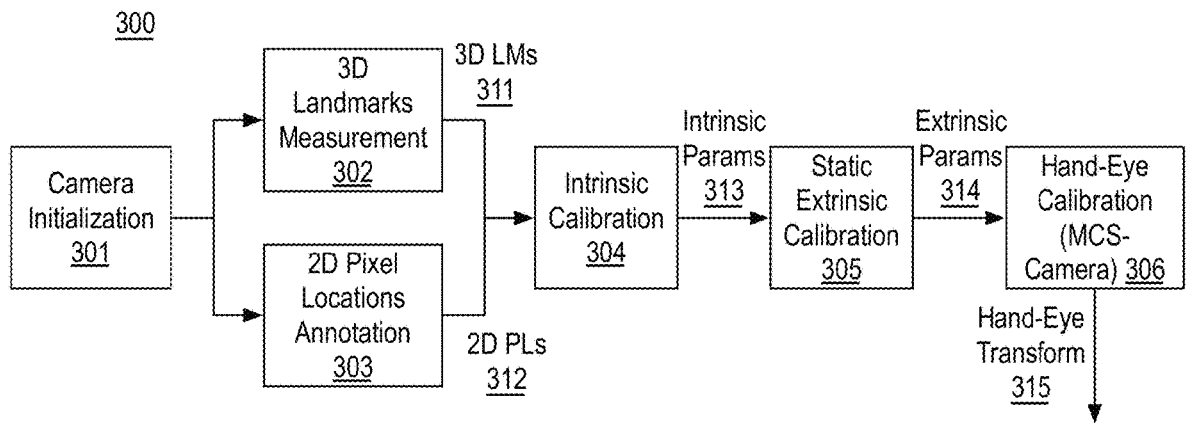
FIG. 3 illustrates an offline calibration system for calibration of a wide-baseline outside-in multi-camera system.

FIG. 3 illustrates an offline calibration system 300 for calibration of wide-baseline outside-in multi-camera system 120, arranged in accordance with at least some implementations of the present disclosure. For example, offline calibration system 300 may be implemented by calibration system 112 prior to monitoring a live event. As shown in FIG. 3, system 300 includes a camera initialization module 301, a 3D landmarks measurement module 302, a 2D pixel locations annotation module 303, an intrinsic calibration module 304, a static extrinsic calibration module 305, and a hand-eye calibration module 306. (MCS to camera) array 111 and a calibration system 112.

Camera initialization module 301 may perform any suitable camera initialization processing. For example, during an initialization or setup phase, cameras 101, 102, 103, 104 and corresponding MCSs 141, 142, 143, 144 are physically installed around scene 110 (and there locations are measured using a total station or other techniques) such as by attachment to a stadium. Furthermore, initialization data is captured such as video or static frame capture, MCS data capture, and so on. In some embodiments, scene 110 is fitted with cones or retro-reflectors or other physical landmarks to aid in attaining image capture landmarks. Similarly, 3D landmarks measurement module 302 performs any suitable processing for the identifying, locating, and storing of data relating to 3D landmarks 311 including installed 3D landmarks and/or inherent landmarks in scene 111. For example, a total station (not shown) may be used to survey scene 111 and to measure 3D locations within coordinate system 109 to generate 3D landmarks 311 for natural or inherent landmarks (i.e., corners of sporting lines and other identifiable features) and the installed landmarks. Notably, total station measurement is advantageous in large scene scenarios and/or outdoor scenarios where the floor or ground is not typically flat (or cannot be assumed to be flat) and the height coordinate is needed at a high level of accuracy. In addition, 2D pixel locations annotation module 303 is used to provide annotated 2D pixel locations 312 corresponding to the 3D landmarks. Such 2D pixel locations 312 may be generated using any suitable technique or techniques such as manual annotation, feature detection, or feature detection followed by manual adjustment.

Using 3D landmarks 311 and corresponding 2D pixel locations 312 (e.g., correspondences), intrinsic calibration module 304 generates intrinsic parameters 313 for each of cameras 101, 102, 103, 104. For example, cameras 101, 102, 103, 104 include intrinsic parameters 313 (or a set of intrinsic parameters) for each of cameras 101, 102, 103, 104. As used herein the term set of parameters may include one or more parameters. Such intrinsic parameters 313 may include any suitable intrinsic parameters such as focal length, image principal point, and distortion such as radial and/or tangential distortion.

In some embodiments, one or more of cameras 101, 102, 103, 104 have a telephoto lens and distortion may be negligible and the camera may be assumed to have no distortion. Furthermore, in such telephoto lens contexts, there may be ambiguity between focal length and depth to target particularly when a landmark or calibration markers is on a planar surface. Such contexts cause typical calibration to be unstable in practice.

Figure 4:
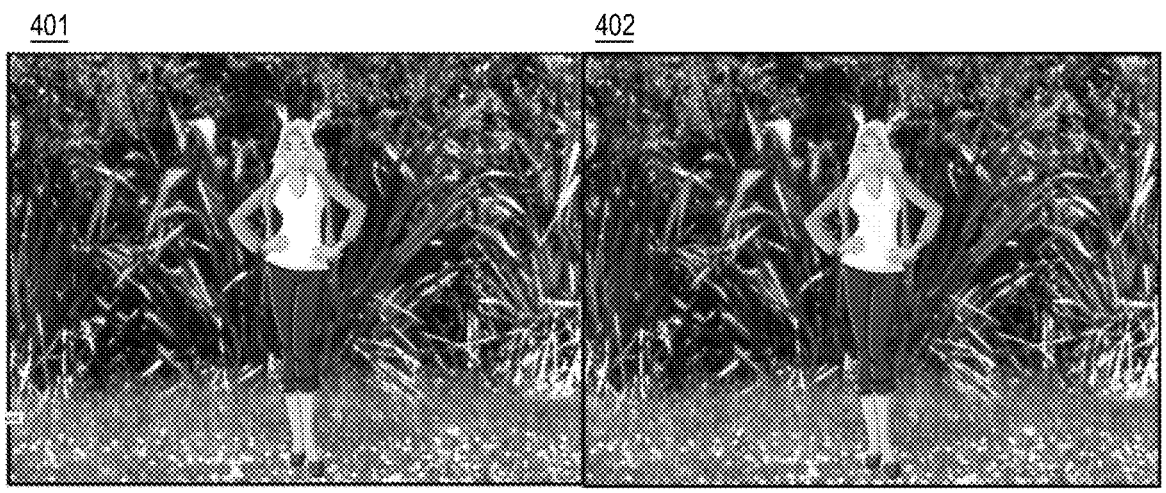
FIG. 4 illustrates example frames showing similar visual cues with substantially differing focal lengths and subject distances.

FIG. 4 illustrates example frames 401, 402 showing similar visual cues with substantially differing focal lengths and subject distances, arranged in accordance with at least some implementations of the present disclosure. For example, in FIG. 4, frame 401 shows a simulated image with a focal length (f) of 54 mm, a distance to subject of 24.1 m and a distance to background of 24.4 m while frame 402 shows a simulated image with a focal length (f) of 35 mm, a distance to subject of 15.6 m and a distance to background of 15.9 m. Such similar images with substantially differing focal lengths and subject distances are common in telephoto lens contexts and cause ambiguity between depth and focal length during intrinsic calibration, which is based on the 2D location of the subject (e.g., a landmark) and the background. For example, when a target calibration image includes a single plane normal to the camera optic axis, estimated focal length and object distance become correlated and self-adjusting with respect to one another. As shown in FIG. 4, the image is almost unchanged when the whole scene is moved forward (e.g., by about 9 m) and the focal length is reduced (e.g., from 54 to 35 mm). When the depth variation is small (e.g., 0.3 m in this example) compared to average depth (e.g., 24.25 m and 15.78 m in this example), focal length estimation is difficult and provides unstable results.

Returning to FIG. 3, for cameras having telephoto lenses (and, in some instances, for scene 111 contexts where depth variation is small), the principal point is set to be the center of the camera sensor, zero distortion is assumed, and a single focal length ($f=f_x=f_y$) is generated using an iterative focal length estimation technique. In some embodiments, determining a focal length for a camera having a telephoto lens and a ground truth position in scene 110 (as determined by camera initialization module 301) is based on iteratively determining a current estimated location of the camera in scene 110 using a current estimated focal length (fc) and 2D-3D landmark correspondences between 2D landmarks in a frame of scene 110 attained from the camera and 3D landmarks in the scene. Such 3D and 2D landmarks are attained by 3D landmarks measurement module 302 and 2D pixel locations annotation module 303, respectively. At each iteration, the current estimated location is compared to the ground truth position. When the distance error between the current estimated location and the ground truth position compares unfavorably to a threshold, a next estimated focal length is generated. When the distance error compares favorably to the threshold, the current estimated focal length is provided as the final resultant focal length. As discussed further herein, each next estimated focal length is determined within a range defined by the current estimated focal length and one of a prior estimated focal length or a maximum or minimum available focal length. Such iterative processing provides a binary search for the focal length to resolve the discussed ambiguity between focal length and depth to target problems that are associated with telephoto lens applications. For example, in the intrinsic calibration setup in some context, a similar setting to that of FIG. 4 is provided where a single calibration image of landmarks (e.g., cones) lying on a flat ground is used for calibration. Although the field plane may not be normal to the camera optic axis, instability in joint optimization of focal length (and translation extrinsics) persists and focal length is advantageously optimized by iteratively binary searching of a-priori known focal length intervals using known translation magnitudes obtained via total station measurements.

Figure 5:
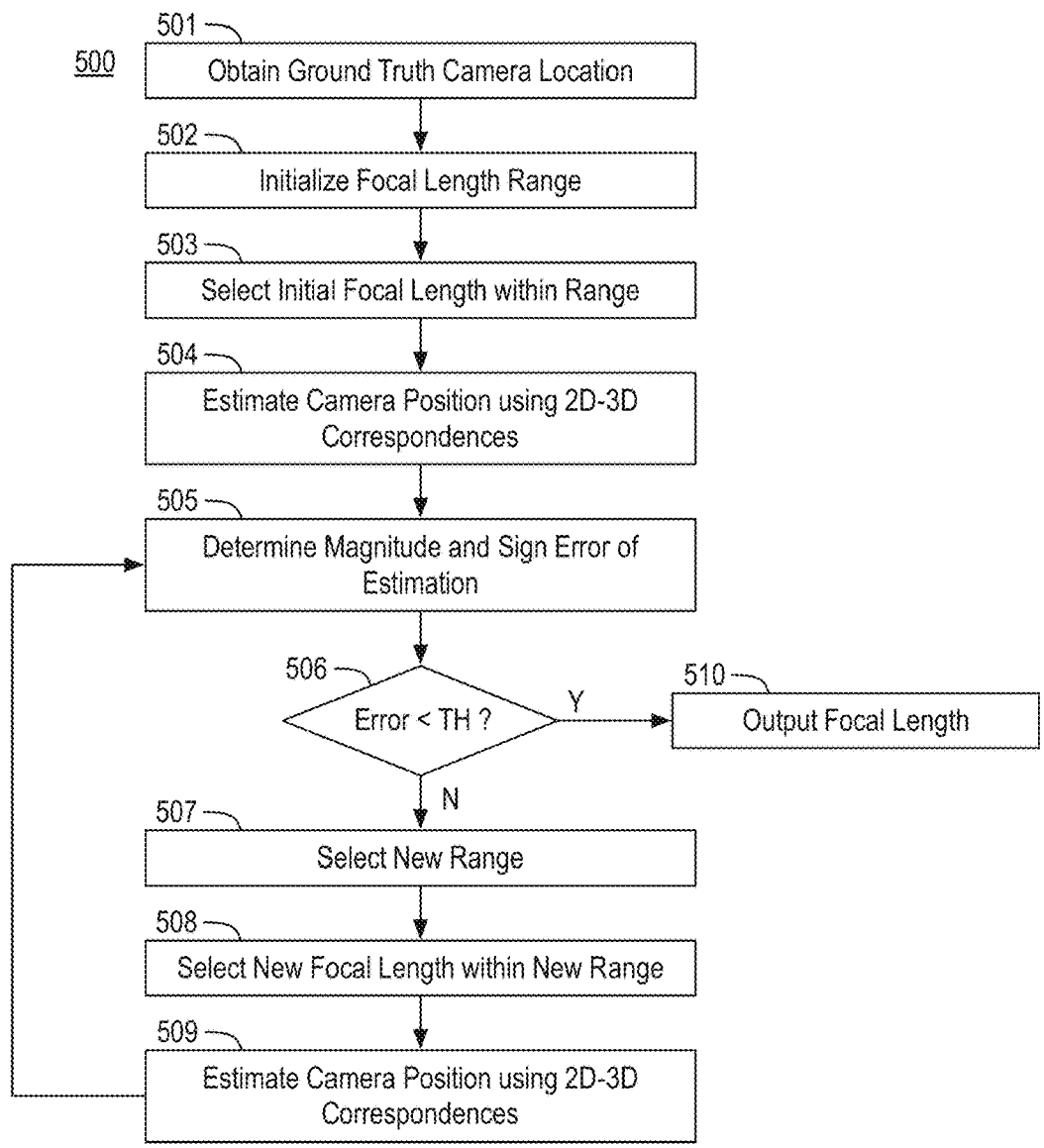
FIG. 5 illustrates an example process for determining a focal length for a camera of a wide-baseline outside-in multi-camera system.

FIG. 5 illustrates an example process 500 for determining a focal length for a camera of a wide-baseline outside-in multi-camera system, arranged in accordance with at least some implementations of the present disclosure. Process 500 may include one or more operations 501-510. For example, operations 501-510 may be performed by intrinsic calibration module 304.

Processing begins at operation 501, where a ground location including a ground truth location magnitude, $|t_i^*|$ is determined for a camera (or for each camera, i, of multiple cameras where process 500 is performed for multiple cameras). For example, the camera may include a telephoto lens. Furthermore, as discussed, the principal point (u, v) for each camera is set as the image center.

Processing continues at operation 502, where a focal length range is initialized for each camera. For example, the initial focal length range may be the full focal length range available for the camera. In some embodiments, the full focal length range is obtained from the lens specifications for min and max focal length. In some embodiments, the focal length range is defined as a range of focal lengths between a minimum focal length and a maximum focal, such that the range may be characterized as $[f_{min}, f_{max}]$. Processing continues at operation 503, where an initial focal length estimate is set for each camera such that the initial focal length estimate is within the full focal length range. The initial focal length estimate may be set at any point within the full focal length range. In some embodiments, the initial focal length estimate is halfway between the min and max focal lengths such that the initial focal length estimate, $f_{est} = (f_{min} + f_{max})/2$.

Processing continues at operation 504, where the camera position and orientation in scene 110 is estimated using the initial focal length estimate, a given intrinsic matrix, K, and known 3D-2D correspondences. For example, the camera position and orientation define a pose of the camera in the scene. For example, for each camera being processed, an estimated location, $t_i$, within scene 110 is determined. As discussed, such 3D-2D correspondences may be provided by 3D landmarks measurement module 302 and 2D pixel locations annotation module 303. The camera position and orientation may be determined using any suitable technique or techniques. In some embodiments, the camera position and orientation are determined using pose from n points (PnP) techniques. For example, the intrinsic matrix may be provided as shown in Equation (1):

$$K = \begin{bmatrix} f_{est} & 0 & u \\ 0 & f_{est} & v \\ 0 & 0 & 1 \end{bmatrix} \quad (1)$$

Processing continues at operation 505, where the magnitude and sign error of the current estimated location is determined using any suitable technique or techniques. In some embodiments, the magnitude and sign error, $E_t$, is the difference between the ground truth location magnitude, $|t_i^*|$, and the estimated location, $|t_i|$. In some embodiments, $E_t = |t_i^*| - |t_i|$. Processing continues at operation 506, where the error is compared to a threshold, E. The threshold may be any suitable value such as a distance of 5 m, a distance of 2.5 m, a distance of 1 m, or the like. Alternately, a relative distance error threshold, such as 1%, may be used. As shown, if the error compares unfavorably to the threshold (e.g., is greater than, exceeds, does not meet, is not less than, etc.), processing continues at operation 507, where a new range is selected, and at operation 508, where a new focal length within the new range is selected.

In embodiments where operations 507, 508 are being performed for the first time, the new range extends from the initial focal length estimate to the maximum focal length (i.e., is a range above the initial focal length estimate) or from the initial focal length estimate to the minimum focal length (i.e., is a range below the initial focal length estimate). When the magnitude and sign error, $E_t$, is less than zero (e.g., $E_t<0$), the higher new range is selected (i.e., the range above the initial focal length estimate extending to the maximum focal length). When the magnitude and sign error, $E_t$, is greater than zero (e.g., $E_t>0$), the lower new range is selected (i.e., the range below the initial focal length estimate extending to the minimum focal length). For example, the focal length interval or range is shrunk to a higher interval (e.g., half interval) when the camera location is estimated as being closer than the actual location or, otherwise, the focal length interval or range is shrunk to a lower interval (e.g., half interval).

In subsequent operations 507, 508, the new range is again reduced from the prior (e.g., by half) and the higher or lower interval or range is selected in the same manner (i.e., the higher interval is selected when the camera location is estimated as being closer than the actual location or the lower interval is selected when the camera location is estimated as being farther than the actual location). Notably, in subsequent operations 507, 508, the new range or interval extends from the current focal length estimate (as one boundary) to another boundary defined based on a prior iteration. The other prior boundary may be defined by the minimum focal length, the maximum focal length, or a yet prior iteration focal length estimate. For example, a binary search technique may be employed to select iteratively smaller ranges that are bracketed by prior boundaries as shown with respect to FIG. 6. At operation 508, the new estimated focal length is selected within the range using any suitable technique or techniques. As with operation 503, In some embodiments, the new estimated focal length is at a midpoint of the newly selected range.

Processing continues at operation 509, where the camera position and orientation in scene 110 is estimated using the newly selected focal length estimate, the intrinsic matrix, K, and the known 3D-2D correspondences in a manner as discussed with respect to operation 504. As shown, processing then iteratively continues from operation 505 to operation 509 until convergence when the error compares favorably to the threshold (e.g., is less than, does not exceed, etc.). When the current estimated focal length provides a camera location within a threshold of the ground truth location, processing continues at operation 510, where the current estimated focal length is output as the final or resultant focal length for the camera. As discussed, the final or resultant focal length may be a part of a set of intrinsic parameters for the camera.

In some embodiments, the resultant output focal length from process 500 is validated based on comparison of a zoom lens setting for the camera. In some embodiments, process 500 is repeated using a number of different camera positions with different landmarks and the resultant output focal lengths are averaged to determine a final focal length. In some embodiments, the coefficient of variation (e.g., $\sigma/\mu$) is used to measure uncertainty and to validate the focal length (e.g., via comparison to a threshold).

Figure 6:
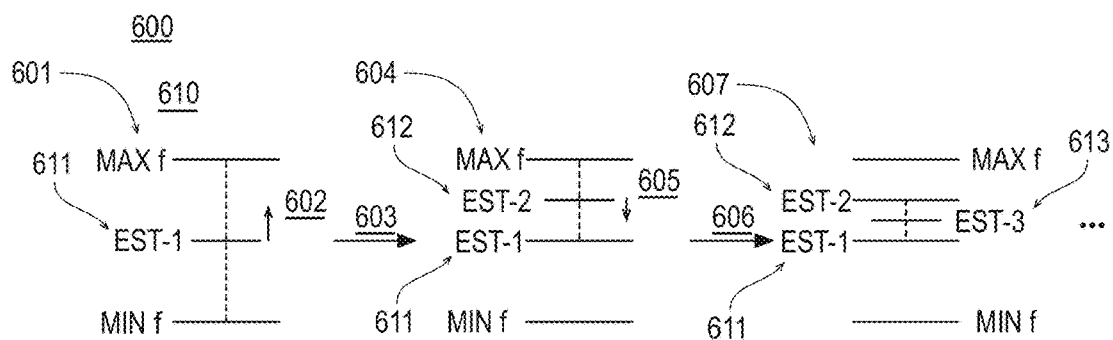
FIG. 6 illustrates example iterative processing for determining a focal length for a camera of a wide-baseline outside-in multi-camera system.

FIG. 6 illustrates example iterative processing 600 for determining a focal length for a camera of a wide-baseline outside-in multi-camera system, arranged in accordance with at least some implementations of the present disclosure. As shown, for a first iteration 610, an initial focal length range 601 is defined to include an interval or range from a minimum available focal length (MIN f) to a maximum available focal length (MAX f). Furthermore, a first estimated focal length 611 (EST-1) is generated a midpoint of focal length range 601. In the example of FIG. 6, after processing via operations 504-507, a determination is made that a corresponding estimated camera position is closer than an actual camera position. As shown with respect to next interval selection 602, in response to the estimated camera position being closer than the actual camera position, a next selected range 604 is above first estimated focal length 611.

Next selected range 604, for iteration 603, is defined using current or first estimated focal length 611 as one boundary of range 604 and a prior boundary as defined by the maximum available focal length (MAX f). That is, when the next range uses a higher range, the low end or boundary of the range is the current estimated focal length 611 and the high end or boundary is the prior high end boundary (in this case maximum available focal length (MAX f)). If the next range were a lower range, the high end or boundary would be the current estimated focal length 611 and the low end or boundary would be the prior low end boundary (in this case maximum available focal length (MAX f)). As shown, second estimated focal length 612 is then selected as the midpoint of range 604.

Continuing the example of FIG. 6, after processing via operations 504-507 in iteration 603, a determination is made that a corresponding estimated camera position is farther than the actual camera position. As shown with respect to next interval selection 60, in response to the estimated camera position being farther than the actual camera position, a next selected range 607 is below second estimated focal length 612. Next selected range 607, for iteration 606, is again defined using current or second estimated focal length 612 as one boundary of range 607 and a prior boundary as defined by first estimated focal length 611. For example, when the next range uses a lower range, the high end or boundary of the range is the current estimated focal length 612 and the low end or boundary is the prior high end boundary (in this case first estimated focal length 611). If the next range were a higher range, the low end or boundary would be the current estimated focal length 612 and the high end or boundary would be the prior high end boundary (in this case maximum available focal length (MAX f)). As shown, third estimated focal length 613 is then selected as the midpoint of range 607 and processing continues in the same manner until convergence is met as discussed with respect to process 500.

Process 500 and related processing is advantageous when zoom and focus of the cameras are fixed while the camera is panning with respect to scene 110. However, in some contexts, the cameras may also be allowed to zoom and focus dynamically while monitoring an event within scene 110. In such contexts the camera may have a telephoto lens or not with both cases causing difficulty due to dynamic zoom and focus. To determine intrinsic camera parameters (including an accurate focal length) in such contexts, the intrinsic camera parameters may be determined by receiving a reported focal length from the camera (e.g., from an application programming interface (API) of the camera) and determining a set of intrinsic parameters for the camera based on interpolation of the set of intrinsic parameters from a number of calibrated (and premeasured) sets of intrinsic parameters each for one of a number of corresponding sample focal lengths. For example, a look-up-table (LUT) may be created using camera API returned zoom-focus values as the key (or input) and calibrated intrinsic parameters including, focal-length, distortion and center-point as output values such that the LUT is prepopulated for selected focal lengths with measured intrinsic parameters.

Figure 7:
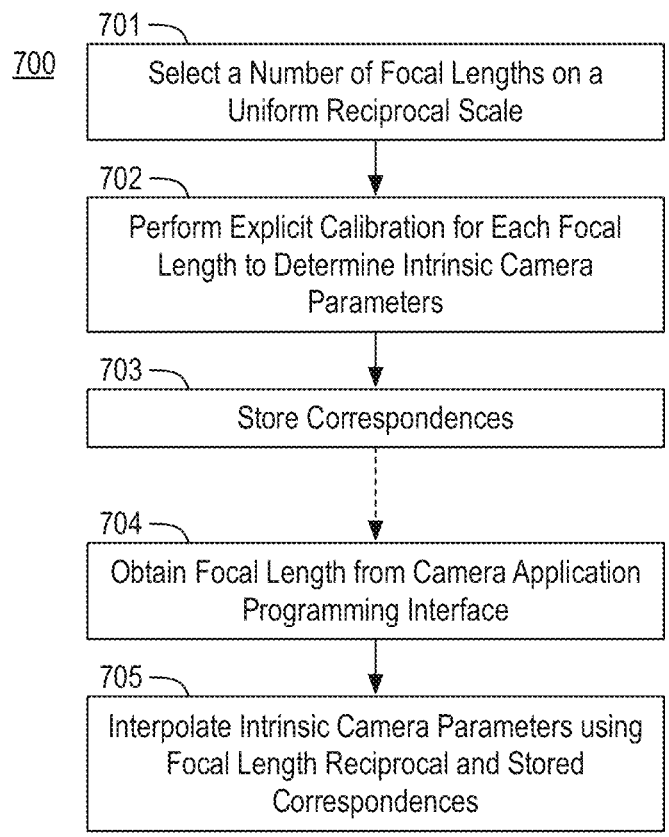
FIG. 7 illustrates an example process for generating intrinsic camera parameters for a camera of a wide-baseline outside-in multi-camera system.

FIG. 7 illustrates an example process 700 for generating intrinsic camera parameters for a camera of a wide-baseline outside-in multi-camera system, arranged in accordance with at least some implementations of the present disclosure. Process 700 may include one or more operations 701-705. For example, operations 701-705 may be performed by intrinsic calibration module 304. In some embodiments, operations 701-703 are performed in an offline or training phase and operations 704,705 are performed in a real-time or implementation phase.

Notably, non-telephoto lenses zoom and varifocal lenses typically have non-zero distortion that varies based on the zoom and focal length values. Furthermore, even with telephoto lenses, the zoom and focus may be allowed to change during video capture. Such contexts require live or real-time calibration of intrinsic camera parameters, which can cause difficulties given the real-time operating requirements of system 120 and the dynamic nature of the events being captured in scene 110. To provide highly accurate intrinsic camera parameters, interpolation is performed based on a focal length provided by the camera to generate the intrinsic camera parameters. For example, a lookup table based techniques may be employed to map discrete values from focal lengths (or zoom-focal length pairs) to intrinsic parameters (e.g., calibrated focal length, principal point, distortion parameters. The lookup table is built offline and deployed as discussed with respect to process 700.

Processing begins at operation 701, where a number of focal lengths are selected such that the selected focal lengths are on a uniform reciprocal scale. As used herein, the term uniform reciprocal scale indicates the reciprocals of the selected values are uniformly distributed (e.g., having the same delta or substantially the same delta between the reciprocal values). For example, a number $N_F$ of different focal lengths may be selected on the uniform reciprocal scale within the zoom range of the lens such that the selected focal lengths include the minimum focal length ($f_{min}$) and the maximum focal length ($f_{max}$) of the camera and lens set up. The selected focal lengths are then chosen such that they are evenly distributed between the minimum focal length and the maximum focal length (e.g., in the interval [$1/f_{max}$, $1/f_{min}$]). For example, for a 70 mm to 200 mm zoom lens, five focal lengths may be selected: 70 mm, 84 mm, 104 mm, 137 mm, and 20 mm Notably, the differences between the reciprocals of the selected focal lengths (0.005, 0.0073, 0.0096, 0.019, and 0.0143) is about the same (0.0023). Such a uniform reciprocal scale advantageously provides an approximately constant motion of the optical lens elements between any two selected focal lengths (e.g., LUT entries), since the focal length has a reciprocal relation with distance between lens elements. Such techniques provide advantageously accurate intrinsic camera parameters in implementation.

Figure 8:
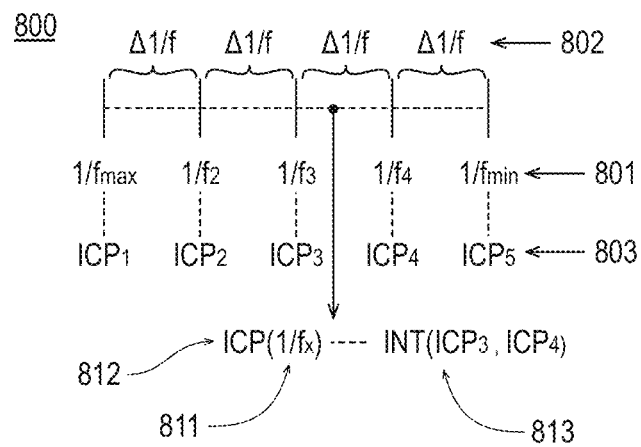
FIG. 8 illustrates example interpolation processing for determining intrinsic camera parameters using an input focal length for a camera of a wide-baseline outside-in multi-camera system.

FIG. 8 illustrates example interpolation processing 800 for determining intrinsic camera parameters using an input focal length for a camera of a wide-baseline outside-in multi-camera system, arranged in accordance with at least some implementations of the present disclosure. As shown, a number of focal lengths are selected (e.g., $f_{max}$, $f_2$, $f_3$, $f_4$, $f_{min}$) such that the reciprocals 801 of the selected focal lengths (e.g., $1/f_{max}$, $1/f_2$, $1/f_3$, $1/f_4$, $1/f_{min}$) have the same or substantially the same reciprocal difference 802 (e.g., $\Delta 1/f$) therebetween. That is $1/f_{max} - 1/f_2 = 1/f_2 - 1/f_3 = 1/f_3 - 1/f_4 = 1/f_{min}$.

Returning to FIG. 7, processing continues at operation 702, where explicit calibration is performed for each of the focal lengths selected at operation 701 to determine intrinsic camera parameters at each of the selected focal lengths, including a calibrated focal length. Notably, the focal length reported by a camera may not accurately match the actual focal length in practice to the accuracy needed for implementation of wide-baseline outside-in multi-camera systems. For example, since the focal length value marked on a zoom lens or that reported by the camera API may be approximate, the intrinsic camera parameters are explicitly calibrated and a set of intrinsic camera parameters including, for example, calibrated focal length, principal point and distortion parameters is created for each selected focal length (e.g., entry in the LUT).

With reference to FIG. 8, as shown, for each of selected focal lengths (e.g., corresponding to reciprocals 801), a set of intrinsic camera parameters 803 are generated via explicit calibration. As shown, in the illustrated example, $ICP_1$ corresponds to $f_{max}$, $ICP_2$ corresponds to $f_2$, $ICP_3$ corresponds to $f_3$, $ICP_4$ corresponds to $f_4$, and $ICP_5$ corresponds to $f_{min}$. Notably, in implementation if a focal value that matches any of $f_{max}$, $f_2$, $f_3$, $f_4$, $f_{min}$ (e.g., the focal lengths selected for calibration), the corresponding intrinsic camera parameters are provided without interpolation.

Returning to FIG. 7, processing continues at operation 703, where the selected focal length reciprocals and calibrated intrinsic camera parameters correspondences are stored for implantation. The correspondences may be stored in any suitable data structure such as a look up table data structure.

Processing continues at operation 704, in an implementation or deployment phase, where a focal length is obtained from an API of the camera or another suitable source such as a physical readout of a dial of the camera or the like. Processing continues at operation 705, where intrinsic camera parameters are determined for the camera using the reciprocal of the reported focal length and the correspondences stored at operation 703 using interpolation techniques. For example, each of the parameters of the intrinsic camera parameters may be generated based on interpolation using the stored parameters and the stored reciprocal values. Such interpolation may be performed using any suitable technique or techniques such as linear interpolation or other interpolation techniques. Notably, since the reciprocal LUT key is indexed for discrete values of focal length, principal point, and distortion parameters may be determined by interpolating corresponding entries using the reciprocal of the received focal length.

With reference to FIG. 8, as shown, for a received focal length ($f_x$), a focal length reciprocal 811 ($1/f_x$) is determined and used for interpolation processing 800. In the illustrated example, focal length reciprocal 811 is between key or stored focal length reciprocals $1/f_3$ and $1/f_4$ of reciprocals 801. Corresponding intrinsic camera parameters 812 for focal length reciprocal 811 are then generated based on an interpolation function (INT) generated using, for example, stored intrinsic camera parameters $ICP_3$, $ICP_4$ (although additional stored intrinsic camera parameters may be used).

Returning to FIG. 3, intrinsic parameters 313 are generated as discussed and provided to static extrinsic calibration module 305, which generates extrinsic parameters 314 that provide camera extrinsic values (location and rotation) for a variety of camera positions and rotations relative to scene 110 to provide initialized calibration of system 120. In some embodiments, each of cameras 101, 102, 103, 104 are pointed to initial positions and extrinsic calibration is performed given known intrinsic camera parameters 313 (as provided by intrinsic calibration module 304) and known 3D-2D correspondences (as provided by 3D landmarks measurement module 302 and 2D pixel locations annotation module 303) and initialized with relative extrinsics using any suitable technique or techniques such as pose from n points (PnP) techniques. In some embodiments, extrinsic calibration is performed at a few different common locations in scene 110 (e.g., locations that are likely to be used in capture). For example, for 100 m sprints, common locations include start, middle and finish regions of the race track. For a soccer field, common locations include the four corners, the penalty kick and free kick locations, and the kick-off central area. Such techniques provide a relatively small database of known extrinsics containing the applicable set of tuples: MCS position and orientation, calibration image, extrinsic calibration, calibration error covariance. In the online phase, as discussed further below, this database of known extrinsics may be used to periodically reset the extrinsic calibration to control calibration drift.

Furthermore, hand-eye calibration module 306 receives extrinsic parameters 314 and other pertinent input data and hand-eye calibration module 306 generates, for each of cameras 101, 102, 103, 104 having corresponding MCSs 141, 142, 143, 144, a hand-eye transform 315 that provides a transform from an MCS reference frame or space (e.g., with the MCS being labeled as a hand) to a camera reference frame or space (e.g., with the camera being labeled as an eye). In some embodiments, such hand-eye calibration is performed using landmarks (natural or inherent landmarks or installed landmarks, as discussed) for improved accuracy over calibration pattern based techniques, particularly for cameras having telephoto lenses. Such techniques may be characterized as direct hand-eye (DHE) calibration and they may satisfy the following requirements: high angular accuracy between MCS and camera (e.g., error <0.075°), the ability to provide a hand-eye transform for cameras with telephoto lenses (e.g., focal lengths of 70 mm to 120 mm corresponding to a field of view of 5° to 9°), and the ability to provide a hand-eye transform without changing lenses (e.g., since the camera may be installed on the MCS via lens mount).

Notably, the hand-eye calibration techniques discussed herein advantageously allows for use of landmarks from scene 110 even if the attained frames do not include enough points (i.e., 3D-2D landmark correspondences) for extrinsic calibration. Such techniques provide for use of landmarks with a wide-angle separation and data from a large number of MCS (e.g., PTU) poses for improved accuracy. The process illustrated in FIG. 9 takes as input camera intrinsic parameters (distortion function, d, and intrinsic matrix, K), initial extrinsic calibration (e.g., $T_w^{C_0}$), and corresponding MCS (e.g., PTU) angles ($\theta_0$, $\varphi_0$) set of tuples (3D landmark location, MCS (PTU) angles at which the image was taken, 2D point annotation in image) and outputs a hand-eye transform (e.g., $T_e^c$) and estimated camera orientation (e.g., extrinsic rotation) error. In some embodiments, generating a hand-eye transform for a camera of the multi-camera system includes transforming 3D landmark points in the scene to a camera reference frame, transforming annotated 2D landmark points for a number of frames attained by the camera to normalized image coordinates, and estimating the hand-eye transform by minimizing distances between the transformed annotated 2D landmark points in the normalized image coordinates and projections of the transformed 3D landmark points to the normalized image coordinates such that the projections are based on application of the hand-eye transform.

Figure 9:
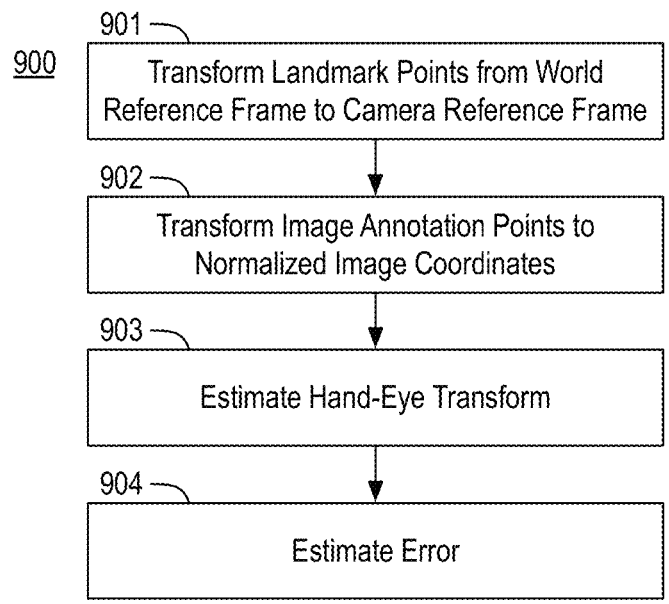
FIG. 9 illustrates an example process for generating a hand-eye transform for a camera of a wide-baseline outside-in multi-camera system.

FIG. 9 illustrates an example process 900 for generating a hand-eye transform for a camera of a wide-baseline outside-in multi-camera system, arranged in accordance with at least some implementations of the present disclosure. Process 900 may include one or more operations 901-904. For example, operations 901-904 may be performed by hand-eye calibration module 306.

Processing begins at operation 901, where landmark points from the world reference frame (e.g., world coordinate system 109) to a camera reference frame for any of cameras 101, 102, 103, 104. Such landmark points may be attained as discussed with respect to 3D landmarks measurement module 302. In some embodiments, 3D landmark points (e.g., x, y, z coordinates) are transformed to the camera reference frame using a transform (e.g., transform matrix) as shown in Equation (2):

$$\bar{X}=T_w^{C_0}X \quad (2)$$

where X is the 3D landmark location, is the transform matrix (e.g., initial extrinsic calibration), and X is the 2D point in the camera reference frame.

Processing continues at operation 902, where image annotation points (e.g., annotated locations of the 3D landmarks in any number of frames attained by the camera as provided by 2D pixel locations annotation module 303 using any number of camera positions) are transformed to normalized image coordinates. Notably, such image annotation points will be used as comparison points for projected 3D points (e.g., by differencing the positions in the normalized image coordinates in an optimization model) in the generation of the hand-eye transform. The image annotation points may be transformed to normalized image coordinates using any suitable technique or techniques such as by application of an inverse distortion and an inverse intrinsic matrix as shown in Equation (3):

$$\bar{x}=K^{-1}d^{-1}(x) \quad (3)$$

where $\bar{x}$ is the location in the normalized image coordinates, d is the distortion function, K is the intrinsic matrix, and x is the 2D annotated pixel location.

Processing continues at operation 903, where the hand-eye transform is estimated based on optimization of an error function that minimizes distances between the points projected to the normalized image coordinates. For example, the landmark points projected onto the image (e.g., the normalized image coordinates) may be provided as shown in Equation (4):

$$\bar{\bar{x}}=P[(T_e^c T_b^e T_{e0}^b T_c^e)\bar{X}_i] \quad (4)$$

where $\bar{\bar{x}}$ is the projected point in the normalized image coordinates, P provides a projection function from 3D to 2D: (x, y, z) to (x/z, y/z), $T_b^e$ transforms from the base of the MCS (e.g., PTU) to end effector (e.g., camera mount) and is determined based on the MCS (PTU) angles, $T_{e0}^b$ transforms from the base of the MCS (e.g., PTU) to an initial position of the end effector (e.g., camera mount) corresponding to initial MCS (e.g., PTU) angles ($\theta_0$, $\varphi_0$), and $T_e^c$ is the hand-eye transform to be optimized.

In some embodiments, the hand-eye transform is then optimized based on solving a non-linear least squares problem as shown in Equation (5):

$$\mathrm{argmin}_{T_e^c} = \sum_i \|x_i - \bar{x}_i\|^2 \quad (5)$$

where $\bar{\bar{x}}$ are the projected point in the normalized image coordinates from the 3D landmarks, $\bar{x}$ is the location in the normalized image coordinates from the 2D annotated landmarks, and $T_e^c$ is the hand-eye transform that is being solved for. The non-linear least squares problem may be optimized using any suitable technique or techniques. Furthermore, although illustrated with respect to squaring the difference between the projected points, other techniques may be used such as minimizing the absolute value of the differences (e.g., using a first order difference measure).

Processing continues at operation 904, where an error estimate is generated using any suitable technique or techniques. In some embodiments, the error estimate is generated using leaving one group out cross-validation. In some embodiments, the data is grouped by MCS (e.g., PTU) positions. In some embodiments, the residual error term is the square of the reprojection error in pixels squared. In some embodiments, the residual error is converted to an angular error using the intrinsic parameters (e.g., focal length).

The techniques discussed with respect to process 900 may advantageously use quaternions to represent rotations. In some embodiments, the translation portion of the hand eye transform is set to zero as the MCS (e.g., PTU) configuration keeps the payload (lens and camera) at the center of rotation. In some embodiments, only N=1 landmark point per MCS (e.g., PTU) position is needed with K=11 MCS (e.g., PTU) poses/images to attain a target hand-eye accuracy. In some embodiments, the frames are obtained by capturing a video of the scene (e.g., an entire track) using a spotlight controller such that the operator stops the MCS (e.g., PTU) motion every 10 m to ensure accurate alignment between the MCS (e.g., PTU) and image frame timing. In some embodiments, a graphical user interface may be employed for improved efficiency and 2D landmark annotation.

Figure 10:
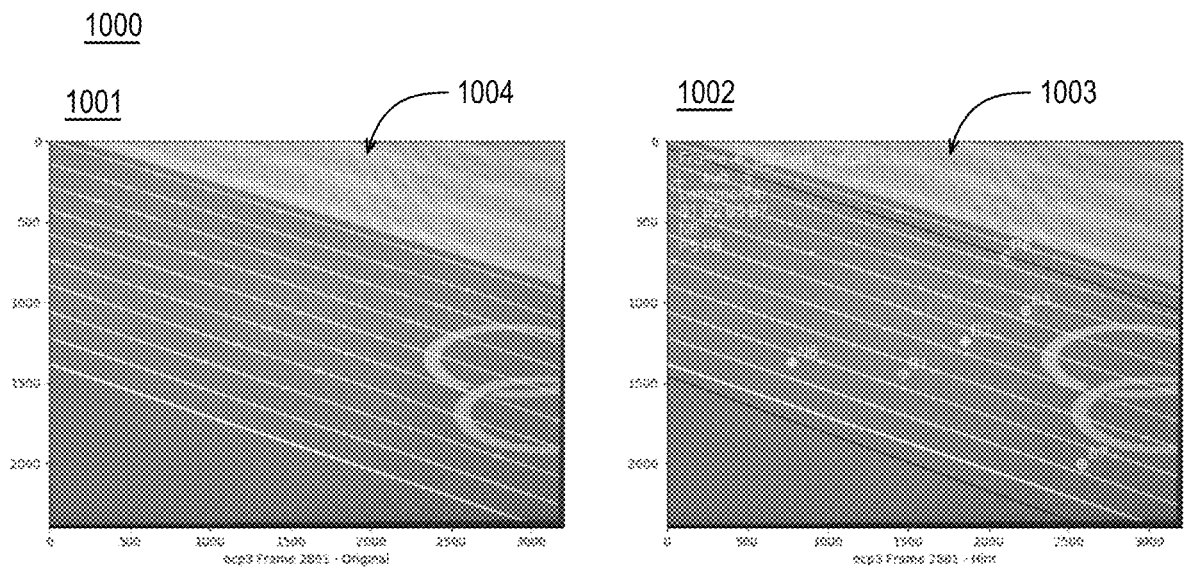
FIG. 10 illustrates example graphical user interface for generating 2D landmark annotations for use in a wide-baseline outside-in multi-camera system.

FIG. 10 illustrates example graphical user interface 1000 for generating 2D landmark annotations for use in a wide-baseline outside-in multi-camera system, arranged in accordance with at least some implementations of the present disclosure. As shown, a first panel 1001 and a second panel 1002 may be displayed to an operator such that both have a background frame or image of scene 110. In left panel 1001, the operator is to select and annotate landmarks in the image such that the 3D landmarks are known in advance. As discussed, such landmarks may include natural or inherent landmarks (dashes on the track, boundary lines, etc.) or installed landmarks (e.g., cones, reflectors, etc.). In some embodiments, the operator is displayed estimated landmark positions 1003 such that the operator can select corresponding landmarks 1004 (none shown as selected in FIG. 10) quickly and accurately. The annotated landmarks are then used in any context discussed herein. For example, frames from captured video containing landmarks are displayed in panel 1003 to the operator and an approximate initial guess for the hand-eye transform is used to display guesses of landmark positions 1003 (e.g., to serve as hints for the user in another panel). In panel 1001, the user then annotates landmarks 1004 using estimated landmark positions 1003 as a guide. As discussed, such annotated landmarks 1004 are then used to generate an optimized hand-eye transform and an error estimate from cross-validation (either of which may be displayed to the operator in real-time).

Discussion now turns to online calibration of wide-baseline outside-in multi-camera system 120.

Figure 11:
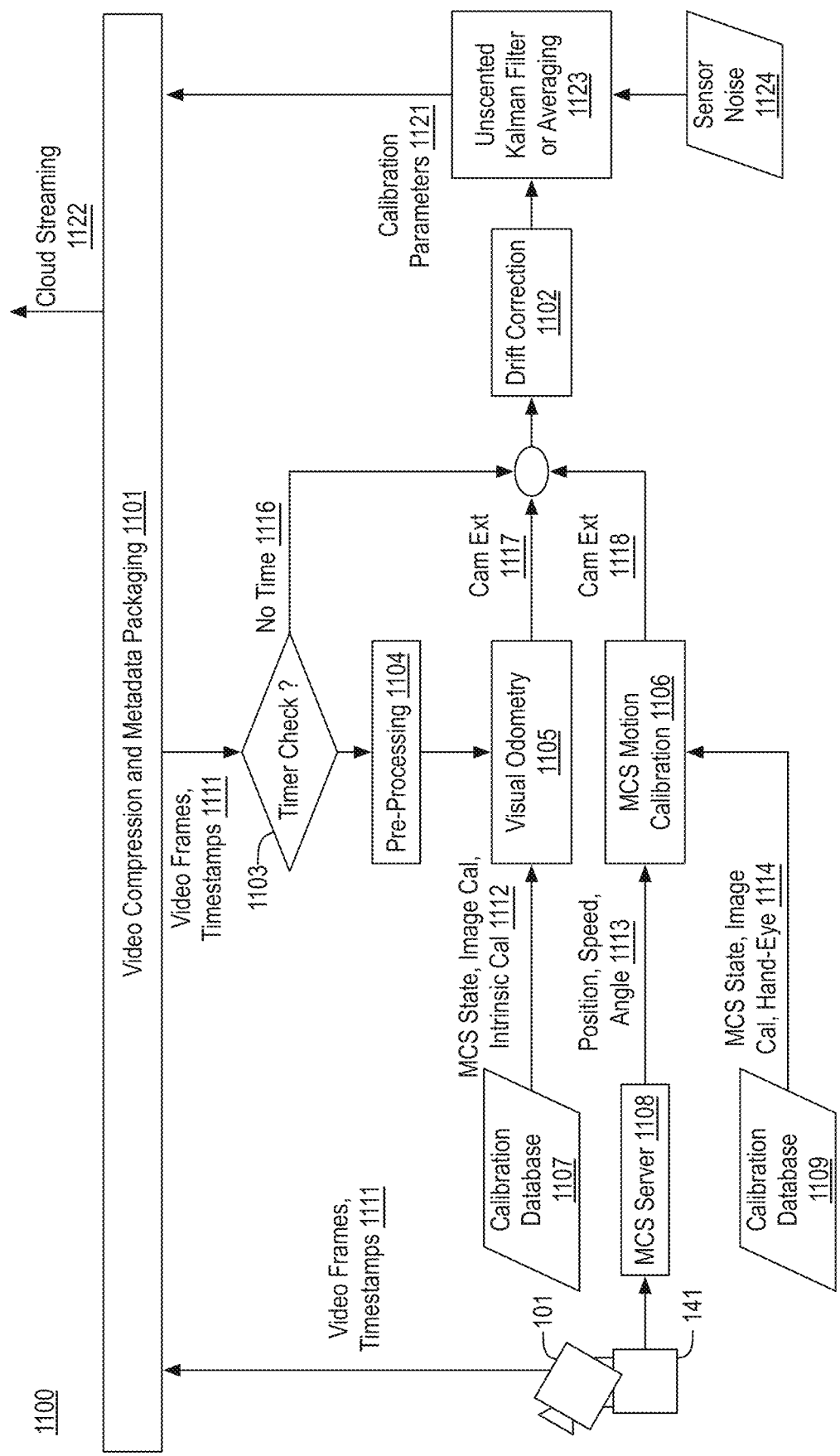
FIG. 11 illustrates a real-time calibration system for calibration of wide-baseline outside-in multi-camera system.

FIG. 11 illustrates a real-time calibration system 1100 for calibration of wide-baseline outside-in multi-camera system 120, arranged in accordance with at least some implementations of the present disclosure. For example, offline calibration system 1100 may be implemented by calibration system 112 during the monitoring of a live event. As shown in FIG. 11, system 1100 includes a video compression and metadata packaging module 1101, a timer check module 1103, a pre-processing module 1104, a visual odometry module 1105, an MCS calibration module 1106, calibration databases 1107, 1109, an MCS server 1108, a drift correction module 1102, an unscented Kalman filter or averaging module 1123, and a sensor noise database 1124. For example, real-time calibration system 1100 provides extrinsic camera parameters 1121 for each of cameras 101, 102, 103, 104 (with only camera 101 illustrated in FIG. 11) for each time instance or time stamp (for each group of synchronized frames having the same time stamp) as cameras 101, 102, 103, 104 pan and/or translate while tracking a live event in scene 110.

Real-time calibration system 1100 provides real-time high accuracy calibration at a variety of video resolutions via implementation in a variety of compute contexts. In some embodiments, each component of system 1100 executes with a dedicated set of threads the number of allocated threads can be configured according to the hardware (e.g. according to the number of available hardware threads or cores). In some contexts, visual odometry requires the most compute resources in system 1100. In some embodiments, the compute resources used by visual odometry module 1105 is controlled by downscaling the frames being processed, which results in a tradeoff between accuracy and speed.

Real-time calibration system 1100 receives as inputs configuration data including initial intrinsic camera parameters (as stored by calibration databases 1107, 1109), initial extrinsic camera parameters (as stored by calibration databases 1107, 1109), and initial hand-eye calibration parameters (as stored by calibration database 1109), which are illustrated as MCS state, image cal, intrinsic cal data 1112 and MCS state, image cal, hand-eye data 1114. Furthermore, real-time calibration system 1100 receives video sequences including video frames and corresponding timestamps 1111 from each of cameras 101, 102, 103, 104 as well as corresponding data including exposure times, and intrinsic calibration parameters. Real-time calibration system 1100 also receives, from MCS server 1108, MCS (e.g., PTU) data packets, which may be polled regularly from MCS server 1108 and provides MCS orientation, angular speed, and MCS timestamps, which is shown as position, speed, angle data 1113. As discussed, real-time calibration system 1100 outputs camera calibration parameters 1121. Video compression and metadata packaging module 1101 receives video frames and timestamps 1111 and camera calibration parameters 1121, and compresses the video frames and packages camera calibration parameters 1121 as corresponding metadata to provide cloud streaming data 1122. In some embodiments, outputting sets of extrinsic parameters for cameras 101, 102, 103, 104 includes compressing video sequences corresponding to cameras 101, 102, 103, 104 to one or more video streams and providing the sets of extrinsic parameters as metadata to the one or more video streams. In other embodiments, camera calibration parameters 1121 is provided as a separate data stream with timestamps for synchronizing with the video stream.

In some embodiments, real-time calibration system 1100 ensures all video capture compute devices and cameras have synchronized clocks. For example, all computer clocks (and many GiGE camera clocks) can be synchronized accurately with a precision time protocol (PTP) such as IEEE1588 precision time protocol. In embodiments where some computer and camera clocks cannot be synchronized, some accuracy will be lost. For every video frame packet or at a preset frequency, MCS server 1108 queries MCS sensors of MCSs 141, 142, 143, 144 for their current states (e.g., location, orientation, speed, etc.), adds time stamps, and provides such data to MCS calibration module 1106.

MCS calibration module 1106 interpolates the received MCS states to the timestamp of each current frame (e.g., to video frames and timestamps 1111). MCS calibration module 1106 then estimates rotation calibration using an MCS motion model (e.g., for a PTU there are angles (θ, φ) and if moving on a rail or the like then there is an added parameter of location (x)). The interpolated MCS is then transformed using the hand-eye transformation (as discussed herein) to the camera coordinate system. Thereby, MCS calibration module 1106 generates camera extrinsic parameters 1118 for each video frame time stamp (e.g., a set of extrinsic parameters for each of cameras 101, 102, 103, 104 for each time instance) using location parameters corresponding to motion control systems 141, 142, 143, 144 coupled to (e.g., via physical mounting) cameras 101, 102, 103, 104 of multi-camera system 120. Such MCS based extrinsic camera parameters 1118 are to be combined with visual odometry based extrinsic camera parameters 1117 for improved real-time calibration. The term visual odometry based indicates extrinsic camera parameters 1117 are generated using camera frames or images while the term MCS based indicates extrinsic camera parameters 1118 are generated using location and orientation parameters.

Timer check module 1103 receives video frames and timestamps 1111 and any other pertinent data and monitors processing to determine whether real-time processing is being performed on track and, when such processing falls behind or when it is predicted that a current timestamp cannot be performed in real-time, timer check module 1103 provides a no time indication 1116 or other indicator to indicate that, for example, visual odometry processing cannot be performed in real-time and camera extrinsic parameters 1118 (as corrected and/or combined with past camera extrinsic parameters) are to be used for the current time instance.

In some embodiments, timer check module 1103 tracks the execution time of all components of system 1100 and automatically switches execution to a faster low-accuracy option if system 1100 overshoots its maximum latency budget. For example, timer check module 1103 may force a switch to MCS-based calibration only. Furthermore, timer check module 1103 may also automatically switch back to slower higher accuracy options (e.g. including visual odometry calibration) once the system delay is again within the latency budget. Such techniques allow system 1100 to continue real-time operation under varying system loads, for example.

Furthermore, timer check module 1103 may vary the downsampling of video frames 1111 to increase throughput (e.g., by increasing the downsampling factor) or to provide more accuracy (e.g., by decreasing the downsampling factor) to maintain real-time processing and achieve the highest available accuracy. Pre-processing module 1104 receives video frames 1111 (and, optionally a downsampling rate from timer check module 1103 although a constant downsampling rate may be used) and pre-processing module 1104 converts video frames 1111 to grayscale by extracting the Y channel from YUV video frames 1111 or using other suitable techniques such as color to grayscale conversion techniques.

Video frames 1111 are then downscaled or downsampled by a scaling factor s based on the tradeoff between computation time and accuracy as discussed above. Furthermore, pre-processing module 1104 estimates motion blur using MCS speed, exposure time, and camera focal length as shown in Equation (6):

$$\text{blur} = P[\text{inv}(R_c^e)\omega_{et}]t_{exp}f s \quad (6)$$

where $R_c^e$ is the rotation portion of the hand-eye transform, $\omega_{et}$ is the angular speed of the end effector of the MCS (e.g., PTU) at time t, $t_{exp}$ is the frame exposure time, f is the focal length, and P is a projection operation (e.g., (x, y, z) to (x/z, y/z). In some embodiments, when blur is signification (e.g., greater than 2 px), blur removal is performed using a Weiner filter or other techniques. In some embodiments, the Weiner filter is designed to invert a convolution with a motion blur filter.

The pre-processed frames are received by visual odometry module 1105, which determines relative rotation and/or translation between successive frame time instances using visual image features in real-time. In case of zoom lenses, an updated focal length may be generated. Furthermore, visual odometry module 1105 generates an error estimate based on a covariance matrix for use in merging MCS based extrinsic camera parameters 1118 and visual odometry based extrinsic camera parameters 1117. Visual odometry module 1105 may generate extrinsic camera parameters 1117 using any suitable technique or techniques. In some embodiments, extrinsic camera parameters 1117 are generated by determining feature correspondences between first and second downsampled temporally sequential frames of a video sequence generating at least a portion of extrinsic camera parameters 1117 using the feature correspondences. Such determination of feature correspondences may be performed via feature detection and matching for particular temporally adjacent frames (e.g., every 10 frames or the like) and between such detection and matching, feature tracking may be performed. Such techniques provide a balance between accuracy as provided by detection and matching and real-time processing as provided by feature tracking.

Figure 12:
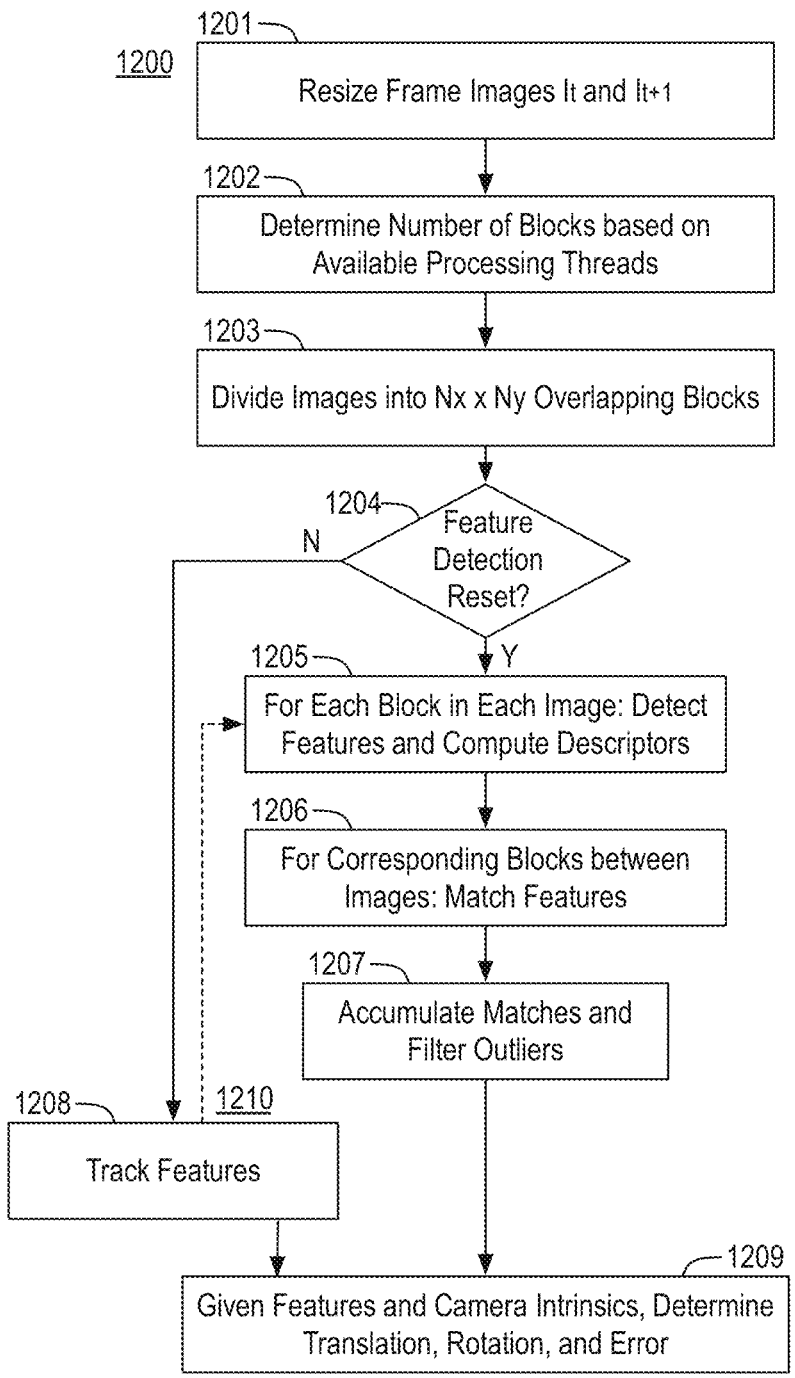
FIG. 12 illustrates an example process for generating extrinsic camera parameters using visual odometry for a camera of a wide-baseline outside-in multi-camera system.

FIG. 12 illustrates an example process 1200 for generating extrinsic camera parameters using visual odometry for a camera of a wide-baseline outside-in multi-camera system, arranged in accordance with at least some implementations of the present disclosure. Process 1200 may include one or more operations 1201-1209. For example, operations 1201-1209 may be performed by pre-processing module 1104 and visual odometry module 1105.

Notably, the techniques discussed herein consider a variety of types of MCSs on which cameras can be mounted (including a PTU with nodal rotation and a PTU with a translation stage). For the case of PTU with nodal rotation, it can be assumed that the rotation axis of the PTU and the camera are coincident and camera translation is negligible such that camera rotation may be determined as purely single viewpoint (SVP) in such contexts. Furthermore, as the extrinsic parameters must be determined in real-time (at 60 fps or more), additional techniques are employed, including: resizing and processing the incoming frames, processing blocks of the frames in parallel using threads, combining full feature detection and matching with tracking techniques to keep track of feature correspondences, and using quaternion representation for stability.

In some embodiments, process 1200 is performed based on the following inputs: a sequence of grayscale image frames ($I_t$, $I_{t+1}$) (e.g., Y channel of YUV422 image frames), an image resize scaling factor (s<1.0), a number of blocks ($N_x$, $N_y$) to divide the image frames into (e.g., with fewer blocks providing faster processing at the cost accuracy), a number ($N_T$) of threads available for processing, and a tracking rest interval (T) in frames (e.g., with detection and matching being performed every T frames and tracking being performed in between). Process 1200 outputs extrinsic camera parameters 1117, which may be a sequence of tuples (quaternion rotation and quaternion covariance) estimates for each pair of successive (e.g., temporally adjacent) frames. It is noted that process 1200 is discussed with respect to generation of rotation only but translation and rotation parameters may be determined as discussed further herein.

Processing begins at operation 1201, where temporally adjacent frames (e.g., from times t and t+1, from times t+1 and t+2, and so on) are resized or downsampled, as discussed, using a downsample or scaling factor s. The scaling factor s may be any suitable value such as 0.5, 0.25, 0.125, or the like and may be applied in both the horizontal and vertical dimensions to downsample the grayscale frames or images.

Processing continues at operation 1202, where a determination is made as to a number of blocks into which each frame is to be divided. In some embodiments, the number of blocks that the frames are to be divided into is based on a number of available processing threads (e.g., as provided by system compute resource monitoring). When the number of available processing threads is higher, greater accuracy is provided and when the number of available processing threads is lower, real-time processing is achieved at the cost of lower accuracy. The number of available processing threads may be any suitable number such as 20, 24, 30, or more, depending upon the available CPUs and other simultaneous workloads. In some embodiments, the number of processing threads is preset. Processing continues at operation 1203, where the temporally adjacent frames are divided into not more than the number of blocks determined at operation 1202. In some embodiments, the temporally adjacent frames are divided into $N_x*N_y$ overlapping blocks such that $N_x*N_y<N_T$. The overlap between adjacent blocks provides for increased feature matching and tracking between frames (e.g., reduces loss of features). In some embodiments, $N_T=24$, $N_x=6$, and $N_y=4$. In some embodiments, operation 1203 is only applied to feature detection reset frames while feature tracking is performed globally and without division into overlapping blocks.

Processing continues at operation 1204, where a determination is made as to whether the current frame time instance is a feature detection reset frame or a tracking frame. As discussed, features are tracked between feature detection and matching resets, which are performed every T frames. The number of frames between resets, T, may be any suitable number such as 4, 5, 8, 10, or 12 frames. For example, the number of frames between resets may be set by a user. In some embodiments, a feature tracking interval is provided between feature detection frames at a user determined frame interval If the current frame time instances corresponds to a detection reset frame (e.g., t mod T=0), processing continues at operation 1205, where, for each block in the each of the frames (e.g., for each block in $(I_t, I_{t+1})$), features are detected and corresponding descriptors are generated. Such features may be any suitable features such as AKAZE features and the descriptors may include any suitable descriptor data. Processing continues at operation 1206 and operation 1207, where the detected features are matched across corresponding blocks (e.g., those in the same spatial location of their respective frames) between frame images $(I_t, I_{t+1})$, accumulated, and outliers are filtered. Such feature matching may be performed using any suitable technique or techniques. In some embodiments, features are matched across blocks using k-nearest neighbors (e.g., with k=2) and a ratio test is used to filter out incorrect matches. In some embodiments, a match is rejected unless the ratio of its distance to the next best match is less than a threshold. In some embodiments, such processing is repeated in the backward direction for matches that pass forward matching test. Notably, since the motion across frames is small, most features remain inside the same block from time t to time t+1.

Returning to operation 1204, when the current frame time instances does not correspond to a detection reset frame (i.e., the frame is a feature tracking frame), processing continues at operation 1208, where features are tracked (e.g., after detection and matching at the detection resets) from the previous frame ($I_t$) to the current frame ($I_{t+1}$) using any suitable technique or techniques such as KLT feature tracking techniques. In some embodiments, when the number of successfully tracked features falls below a threshold a switch is made to explicit feature detection and matching for the current frame (as shown with respect to process path 1210) using the techniques discussed with respect to operations 1205, 1206, 1207. As discussed, in some embodiments, such feature tracking is performed globally without division of the frames into overlapping blocks.

Processing continues from operation 1207 or operation 1208 at operation 1209, where, given a set of tracked features and a camera intrinsic matrix (e.g., via intrinsic camera parameters), extrinsic camera parameters are generated. In some embodiments, generating the extrinsic camera parameters includes estimating rotation quaternion parameters or values by minimizing the angle formed by back-projected rays rotated by current estimate of rotation such that the rotation may initialized as identity. In some embodiments, the error covariance for the rotation quaternion is also determined using any suitable technique or techniques.

As discussed, in some embodiments, PTU are employed such that translation may be assumed to be zero. In some embodiments, PTU on tracks (or other MCSs with translation capability such as a crane) are employed. In such embodiments, there is also a translation component that needs to be estimated at operation 1209 such that operation 1209 includes feature triangulation and bundle adjustment over 3D points and rotation-translation using any suitable technique or techniques such as structure-from-motion (SfM) technique. In some embodiments, since the translation for the first pair of images using visual odometry has magnitude one, this translation vector is multiplied with the magnitude $t_M$ obtained from the corresponding first MCS motion. Thereafter, all translation between successive frames determined using visual odometry may be scaled by $t_M$ prior to input for fusion or averaging as discussed with respect to unscented Kalman filter or averaging module 1123.

As shown, drift correction may be provided by drift correction module 1102 prior to application of unscented Kalman filter or averaging module 1123. For example, in visual odometry, since calibration estimates for the current frame are obtained by cumulative accumulation from pair-wise estimates from previous frames, they tend to accumulate error and thus drift with time. Furthermore, physical camera weight may cause drift over time. To handle drift, a set of images of scene 110 are captured with known MCS configuration and used as reference to compute calibration for the current frame. In some embodiments, system 120 is initialized and/or reset with calibration data from the previously discussed small database of tuples (e.g., MCS position and orientation, calibration image, extrinsic calibration, calibration error covariance generated during the offline phase. Such techniques ensure that accumulated drift is periodically eliminated and also provides robustness against small uncontrolled MCS motion such as an accidental push when the system is not in operation. In some embodiments, such drift reset includes determining a camera, based on a motion control system coupled to the camera, has a current position and orientation within a threshold of an initialization position and orientation of the camera and setting, in response to the determination, extrinsic parameters for the first camera to initialized extrinsic parameters corresponding to the initialization position and orientation.

For example, drift correction module 1102 checks whether any calibration database entry (e.g., as stored by calibration databases 1107, 1109) has a close MCS position and orientation to the current MCS position and orientation of an MCS (e.g., one of MCS 141, 142, 143, 144) corresponding to a particular camera (e.g., one of cameras 101, 102, 103, 104). The determination as to whether such MCS positions and orientations are close may be made using any suitable technique or techniques. In some embodiments, each position and orientation value must be less than a corresponding threshold (e.g. within 0.1° for rotational values and 0.1 m for translational values). In some embodiments, the differences (e.g., absolute values of differences, sums of squares of differences, etc.) for all rotational and translation values are summed and compared to a single threshold.

When a calibration database entry has a close MCS position and orientation to the current MCS position and orientation of an MCS, the database extrinsic camera parameters are used for the calibration (e.g., the initialized values replace current values) and the MCS state is set to $T_{e0}^b$ (e.g., a transform from the base of the MCS (e.g., PTU) to an initial position of the end effector (e.g., camera mount) of the MCS). In addition or in the alternative, extrinsic camera parameters may be updated with only visual odometry comparing the calibration image frame with the current image frame and the filter may be reset or initialized with this extrinsic. In some embodiments, the other components (linear and angular velocity) of the state are not updated. In some embodiments, the extrinsics component of the state covariance are determined using the unscented transform, as the visual odometry update is non-linear and the components of the state covariance are not updated.

As discussed, MCS based extrinsic camera parameters 1118 and visual odometry based extrinsic camera parameters 1117 are combined for improved real-time calibration via unscented Kalman filter or averaging module 1123. MCS based extrinsic camera parameters 1118 and visual odometry based extrinsic camera parameters 1117 may be combined using any suitable technique or techniques such as averaging, weighted averaging, alpha-beta filtering, covariance weighted averaging, etc. In some embodiments, MCS based extrinsic camera parameters 1118 and visual odometry based extrinsic camera parameters 1117 are combined to generated calibration parameters 1121 based on application of an unscented Kalman filter as implemented by unscented Kalman filter or averaging module 1123. In some embodiments, calibration parameters 1121 are generated by combining extrinsic camera parameters 1117 with extrinsic camera parameters 1118 by applying an unscented Kalman filter to the extrinsic camera parameters 1117, 1118 based on sensor noise from the one or more motion control systems and/or noise from visual odometry used to generate extrinsic camera parameters 1117.

For example, sensor fusion may be implemented by unscented Kalman filter or averaging module 1123 using an unscented Kalman filter to correctly model the non-linear system model of a camera and MCS undergoing rotation and translation. In some embodiments, rotation is represented with quaternions for improved accuracy (e.g., as compared to using rotation matrices) and to avoid gimbal lock (e.g., as compared to using Euler angles). The full rigid body transform from reference frame e to reference frame b is represented as the quaternion-rotation and translation pair $T_e^b$ as shown in Equations (7), which also provides the product of two transforms ($T_1*T_2$):

$$T_e^b = (q_e^b, t_e^b)$$

$$T_1*T_2 = (q_1*q_2, q_1[t_2]+t_1) \quad (7)$$

where $q_1[t_2] := q_1*t_2*q_1^{-1}$ is the translation $t_2$ rotated by the quaternion $q_1$.

In some embodiments, the camera extrinsics rotation is treated as an internal system state that is observed through the MCS (e.g., PTU) rotation angles and the SVP-VO (single viewpoint-visual odometry) incremental rotation. Since the rotation update equations are non-linear, an unscented Kalman filter may be advantageously employed as a state estimator to perform sensor fusion. Such techniques take into account individual sensor measurement errors (e.g., expressed as covariance matrices) to provide an accurate camera extrinsics estimate via camera calibration parameters 1121.

For example, the general non-linear state estimation problem with non-additive noise may be given by a process equation and a measurement equation that are shown, in turn, in Equations (8):

$$x_{t+1} = f(x_t, \delta t, v_t)$$

$$y_t = h(x_t, n_t) \quad (8)$$

Here, the system process may be represented by a function $f(\bullet)$ that transforms the current system state $x_t$ at iteration t after receiving input $v_t$. Also, $\delta_t$ is defined as the time between iterations. In some embodiments, process noise is not used in the model. Furthermore, an observer receives the measurement $y_t$ as a result of the measurement function $h(\bullet)$, which is corrupted non-linearly by the measurement noise, $n_t$.

In such contexts, the system state is then represented as shown in Equations (9):

$$x_t: \{T_t: (R_w^{ct}, t_w^{ct}) \text{camera intrinsic rotation-translation,}$$
$$(\omega_{ct}, v_{ct}) \text{angular and linear velocity in camera frame}\} \quad (9)$$

where $(R_w^{ct}, t_w^{ct})$ is the camera intrinsic rotation-translation and $(\omega_{ct}, v_{ct})$ provides the angular and linear velocity in camera frame. For example, the unscented Kalman filter may be applied based on modeling a nonlinear kinematic state transition of a camera resulting from motion of a corresponding motion control system and corresponding nonlinear measurements from visual odometry.

Furthermore, the system measurement is represented as $y: V_t: VO$ (visual odometry) measured camera transformation (rotation-translation) from frame t−1 to frame t, $\theta_{et}, p_{et}$: MCS rotation and translation (of a base frame), and $\omega_{et}, v_{et}$: MCS rotational and linear velocity vectors (of an end effector frame). The process (state transition) is then provided as shown in Equations (10) where there is no process noise:

$$F: T_t = \Delta T_{t-1} * T_{t-1}$$

with $\Delta T = T_{ct-1}^{ct} = [\{\cos(|\omega_{ct-1}|\delta t/2), \sin(|\omega_{ct-1}|\delta t/2)$
$\hat{\omega}_{ct-1}), v_{ct-1}\delta t]$ $$\omega_{ct} = \omega_{ct-1}, v_{ct} = v_{ct-1} \quad (10)$$

The system measurement equations are then provided as follows. The camera (SVP-VO) measurement is provided as shown in Equation (11):

$$V_t = \Delta T_{t-1} * T(q_{nvo}, p_{nvo}) \quad (11)$$

and the MCS (base reference frame) is provided as shown in Equation (12):

$$T_b^{ef}(\theta_{et}, p_{et}) = T_b^e(n_{\theta t}, n_{pt}) * T_c^e * T_t^* * \text{inv}(T_w^{c0}) * \text{inv}(T_c^e)$$
$$* T_b^{e0} \quad (12)$$

where $T_b^e$ is the MCS motion model mapping MCS angle and position measurements to a transform from MCS base to MCS end effector, $T_b^{e0}$ is the initial value corresponding to the initial calibration, and $(n_{\theta t}, n_{pt})$ is the noise rotation and translation vectors. The MCS (end effector reference frame) is provided as shown in Equation (13):

$$\omega_{et} = R_c^e[\omega_{ct}]n_\omega$$

$$v_{et} = R_c^e[v_{ct}] + (n_v; 0) \quad (13)$$

where $R_c^e[\omega_{ct}]$ denotes the vector $\omega_{ct}$ rotated by the quaternion $R_c^e$. Measurement noise is then provided as shown in Equation (14):

$$\{q_{nvo}, p_{nvo}, n_{\theta t}, n_{pt}, n_\omega, n_v\} \quad (14)$$

Finally, the system state is augmented with noise variables to model non-additive noise as shown in Equation (15):

Augmented State: $x_a: \{T_t, \omega_{ct}, v_{ct}, q_{nvo}, p_{nvo}, n_{\theta t}, n_{pt}, n_\omega,$
$n_v\}$ with covariance: $P_a: \{\Sigma T_t, \Sigma \omega_{ct}, \Sigma v_{ct}, \Sigma q_{nvo}, \Sigma p_{nvo}, \Sigma n_{\theta t},$
$\Sigma n_{pt}, \Sigma n_\omega, \Sigma n_v\} \quad (15)$ In some embodiments, manufacturer estimates are used for MCS angle, translation, and angular and linear velocity noise. In some embodiments, the system is initialized with the initial calibration data and uncertainty corresponding to such covariance estimates. For a first frame (temporally), the calibration is updated using only SVP-VO data as the camera may have shifted accidentally without MCS (e.g., PTU) motion. Such techniques provide for a reset of the initial calibration state. Form the next frame onwards, SVP-VO and MCS (e.g., PTU) data are fused to update the calibration. In some embodiments, the square root unscented Kalman filter variant is employed for the sake of stability. Such techniques maintain and update square root of covariance matrices and reduces the ratio of the min and max entries in numerical calculations.

In some embodiments, for fast operation (e.g., in response to a time instance falling behind real-time operation as discussed with respect to timer check module 1103), covariance weighted quaternion averaging is employed as an alternative sensor fusion technique. In some embodiments, the visual odometry camera rotation estimate is obtained by updating the previous frame camera rotation with the incremental rotation produced by visual odometry. In some embodiments, camera rotation in the current frame is determined independently using the MCS and the two are averaged, each being weighted by their standard deviations, which provides the current frame estimate of the camera rotation. In some embodiments, the translation component is directly averaged.

Figure 13:
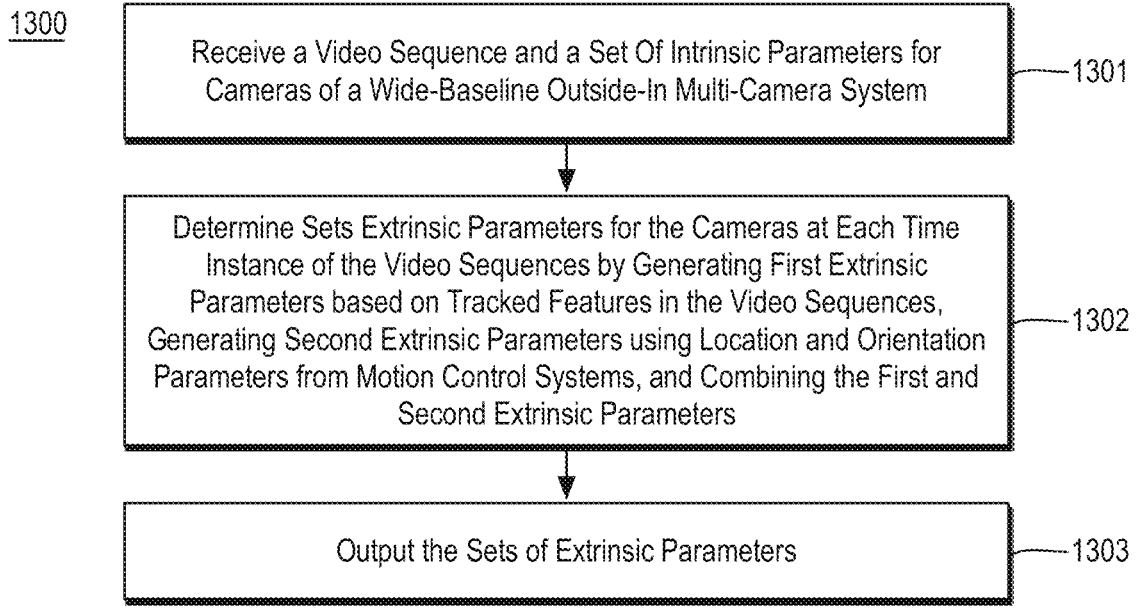
FIG. 13 is a flow diagram illustrating an example process for calibrating a wide-baseline outside-in multi-camera system.

FIG. 13 is a flow diagram illustrating an example process 1300 for calibrating a wide-baseline outside-in multi-camera system, arranged in accordance with at least some implementations of the present disclosure. Process 1300 may include one or more operations 1301-1303 as illustrated in FIG. 13. Process 1300 may form at least part of a wide-baseline outside-in multi-camera system calibration process, for example. By way of non-limiting example, process 1300 may form at least part of a process as performed by system 120 as discussed herein. Furthermore, process 1300 will be described herein with reference to apparatus 1400 of FIG. 14.

Figure 14:
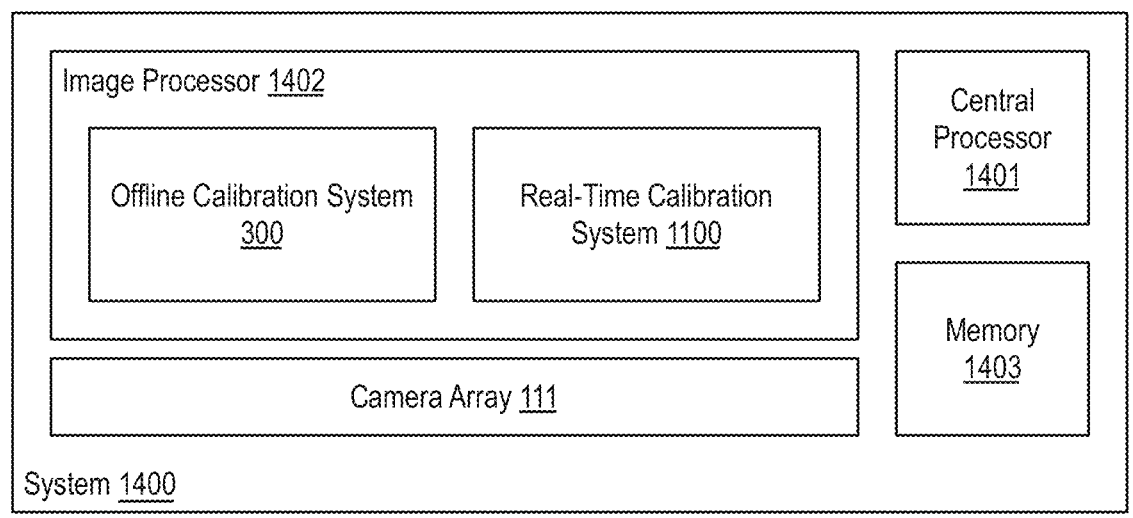
FIG. 14 is an illustrative diagram of an example apparatus for calibrating a wide-baseline outside-in multi-camera system.

FIG. 14 is an illustrative diagram of an example apparatus 1400 for calibrating a wide-baseline outside-in multi-camera system, arranged in accordance with at least some implementations of the present disclosure. The terms apparatus and system are used interchangeably herein. As shown in FIG. 14, apparatus 1400 includes a central processor 1401, an image processor 1402, a memory 1403, and camera array 111. Also as shown, image processor 1402 may include or implement offline calibration system 300 and/or real-time calibration system 1100. In the example of apparatus 1400, memory 1403 may store input video sequences or frames, intrinsic and/or extrinsic camera parameter, MCS data, look up table data, 3D landmark data, 2D landmark data, hand-eye transform data, extrinsic parameter fusion data, noise data, or any other data discussed herein.

As shown, in some examples, one or more or portions of offline calibration system 300 and/or real-time calibration system 1100 are implemented via image processor 1402. In other examples, one or more or portions of offline calibration system 300 and/or real-time calibration system 1100 are implemented via central processor 1401, an image processing unit, an image processing pipeline, an image signal processor, a graphics processing unit, a graphics processing pipeline, a graphics processor, or the like. In some examples, one or more or portions of offline calibration system 300 and/or real-time calibration system 1100 are implemented in hardware as a system-on-a-chip (SoC). In some examples, one or more or portions of offline calibration system 300 and/or real-time calibration system 1100 are implemented in hardware via a FPGA.

Image processor 1402 may include any number and type of image or graphics processors or processing units that may provide the operations as discussed herein. Such operations may be implemented via software or hardware or a combination thereof. For example, image processor 1402 may include circuitry dedicated to manipulate and/or analyze frames or frame data obtained from memory 1403. Central processor 1401 may include any number and type of processors, processing units, or modules that may provide control and other high level functions for apparatus 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory. In an embodiment, one or more or portions of offline calibration system 300 and/or real-time calibration system 1100 are implemented via an execution unit (EU) of image processor 1402. The EU may include, for example, programmable logic or circuitry such as a logic core or cores that may provide a wide array of programmable logic functions. In an embodiment, one or more or portions of offline calibration system 300 and/or real-time calibration system 1100 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where a video sequence and a set of intrinsic parameters are received for each camera of a wide-baseline outside-in multi-camera system. As discussed, the video sequences each a number of video frames of a scene viewed by the cameras such that the video sequences are sequenced along shared time instances. For example, a first frame of each video sequence corresponds to a first time instance, a second frame of each video sequence corresponds to a second time instance, and so on. In some embodiments, one or more of the sets of intrinsic parameters are generated or calibrated in an offline calibration performed prior to the commencement of process 1300.

In some embodiments, the sets of intrinsic parameters include focal lengths of one or more of the cameras of the wide-baseline outside-in multi-camera system. In some embodiments, process 1300 includes determining a focal length for a first camera of the multi-camera system having a telephoto lens and a ground truth position in the scene based on iteratively determining a current estimated location of the first camera in the scene using a current estimated focal length and 2D-3D landmark correspondences between 2D landmarks in a frame of the scene from the first camera and 3D landmarks in the scene and comparing the current estimated location to the ground truth position and generating a next estimated focal length when a distance between the current estimated location and the ground truth position compares unfavorably to a threshold or providing the current estimated focal length as the focal length when the distance compares favorably to the threshold, such that the next estimated focal length is within a range defined by the current estimated focal length and one of a prior estimated focal length or a maximum or minimum available focal length. In some embodiments, the next estimated focal length is within a higher focal length range in response to the current estimated location being closer to the 3D landmarks than the ground truth position.

In some embodiments, the sets of intrinsic parameters include a first set of intrinsic parameters for a first camera of the wide-baseline outside-in multi-camera system. In some embodiments, generating the first set of intrinsic parameters for the first camera of the multi-camera system includes receiving a reported focal length from the first camera and determining the first set of intrinsic parameters based on interpolation of the first set of intrinsic parameters from a plurality of calibrated sets of intrinsic parameters each for one of a plurality of sample focal lengths. In some embodiments, the sample focal lengths are on a uniform reciprocal scale such that intervals between adjacent reciprocals of the sample focal lengths are substantially the same.

In some embodiments, process 1300 further includes generating a hand-eye transform for a first camera of the multi-camera system by transforming 3D landmark points in the scene to a camera reference frame, transforming annotated 2D landmark points for a plurality of frames attained by the first camera to normalized image coordinates, and estimating the hand-eye transform based on minimizing distances between the transformed annotated 2D landmark points in the normalized image coordinates and projections of the transformed 3D landmark points to the normalized image coordinates such that the projections include application of the hand-eye transform.

Processing continues at operation 1302, where a set of extrinsic parameters are determined for each camera and for each time instance of the video sequences by generating first extrinsic parameters based on tracked features in the video sequences, generating second extrinsic parameters using location and orientation parameters corresponding to one or more motion control systems coupled to one or more corresponding cameras of the multi-camera system, and combining the first extrinsic parameters with second extrinsic parameters to provide at least a portion of the sets of extrinsic parameters. In some embodiments, the first extrinsic parameters correspond to a first camera of the multi-camera system and the first extrinsic parameters are generated by determining feature correspondences between first and second downsampled temporally sequential frames of a first video sequence based on feature detection between a number of overlapping blocks of the first and second downsampled sequential frames and generating at least a portion of the first extrinsic parameters using the feature correspondences. In some embodiments, the number of overlapping blocks is determined based on a number of available processing threads and said feature detection is in response to the first and second downsampled sequential frames being feature detection frames that define a feature tracking interval provided between feature detection frames at a user determined frame interval. In some embodiments, in response to a third downsampled sequential frame of the first video sequence being a feature tracking frame, process 1300 further includes globally tracking features between the second and third downsampled sequential frames to determine second feature correspondences and generating third extrinsic parameters using the second feature correspondences.

In some embodiments, the first extrinsic parameters correspond to a first camera of the multi-camera system and the first extrinsic parameters generated by determining the first camera, based on a first motion control system coupled to the first camera, has a current position and orientation within a threshold of an initialization position and orientation of the first camera and setting, in response to said determination, third extrinsic parameters for the first camera to initialized extrinsic parameters corresponding to the initialization position and orientation. In some embodiments, combining the first extrinsic parameters with the second extrinsic parameters includes applying an unscented Kalman filter to the first and second extrinsic parameters based on sensor noise from the one or more motion control systems and noise from visual odometry used to generate the first extrinsic parameters. In some embodiments, the unscented Kalman filter is applied based on modeling a nonlinear kinematic state transition of a first camera resulting from motion of a corresponding first motion control system and corresponding nonlinear measurements from the visual odometry.

Processing continues at operation 1303, where the sets of extrinsic parameters are output for use in any suitable context such as multi-view computer vision, artificial intelligence (AI) applications such as 3D human skeleton tracking, activity analysis or tracking, analysis of small objects, or other uses. In some embodiments, outputting the sets of extrinsic parameters includes compressing the video sequences to one or more video streams and providing the sets of extrinsic parameters as metadata to the one or more video streams.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations of process 1200 or others discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a non-transitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
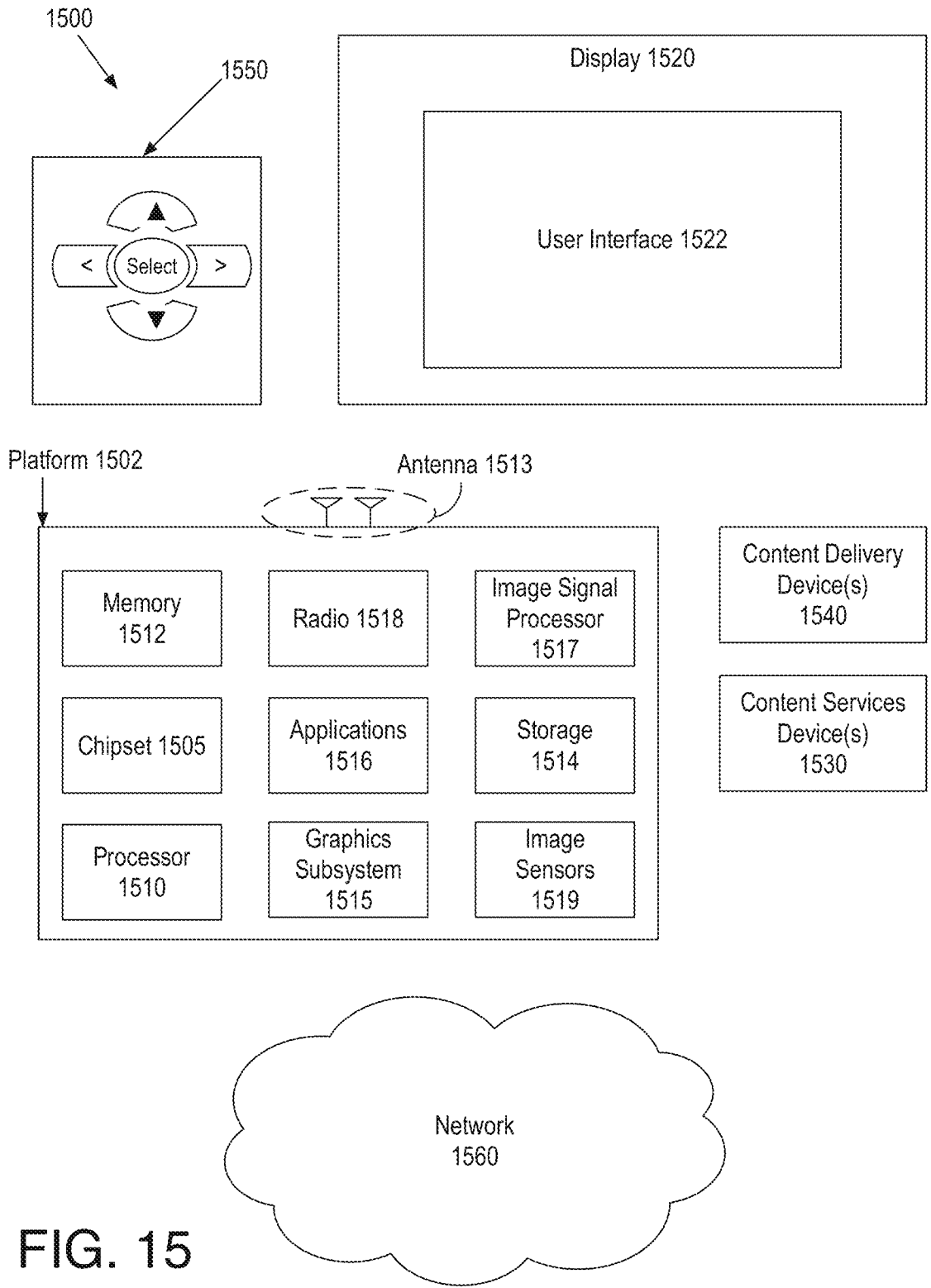
FIG. 15 is an illustrative diagram of an example system.

FIG. 15 is an illustrative diagram of an example system 1500, arranged in accordance with at least some implementations of the present disclosure. In various implementations, system 1500 may be a mobile device system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1500 includes a platform 1502 coupled to a display 1520. Platform 1502 may receive content from a content device such as content services device(s) 1530 or content delivery device(s) 1540 or other content sources such as image sensors 1519. For example, platform 1502 may receive image data as discussed herein from image sensors 1519 or any other content source. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516, image signal processor 1517 and/or radio 1518. Chipset 1505 may provide intercommunication among processor 1510, memory 1512, storage 1514, graphics subsystem 1515, applications 1516, image signal processor 1517 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Image signal processor 1517 may be implemented as a specialized digital signal processor or the like used for image processing. In some examples, image signal processor 1517 may be implemented based on a single instruction multiple data or multiple instruction multiple data architecture or the like. In some examples, image signal processor 1517 may be characterized as a media processor. As discussed herein, image signal processor 1517 may be implemented based on a system on a chip architecture and/or based on a multi-core architecture.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

Image sensors 1519 may include any suitable image sensors that may provide image data based on a scene. For example, image sensors 1519 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1519 may include any device that may detect information of a scene to generate image data.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
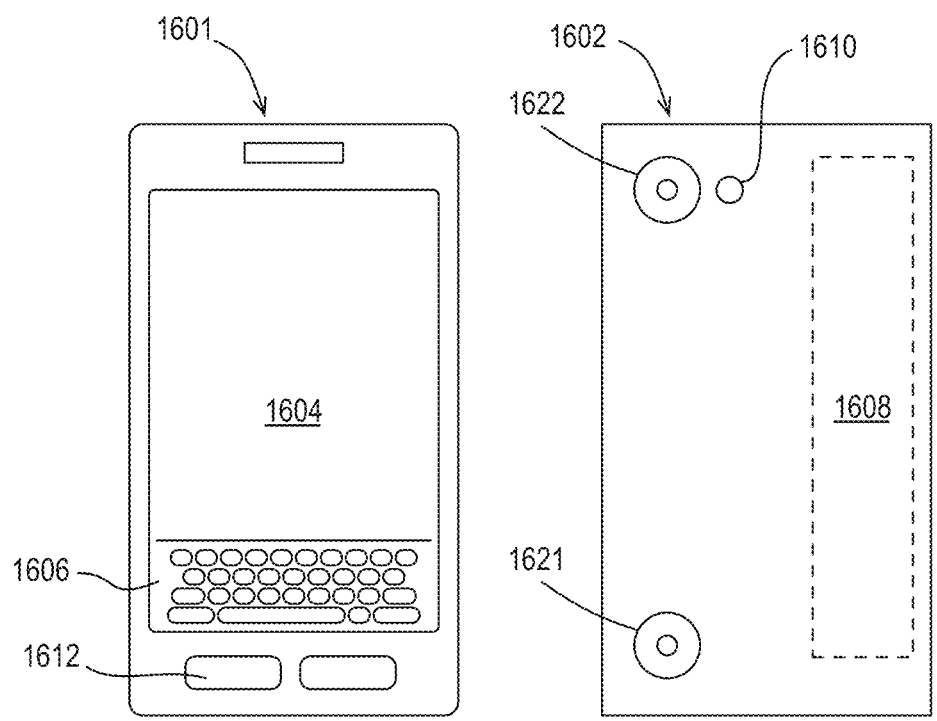
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems, components, or modules discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, a color camera 1621, a color camera 1622, and an integrated antenna 1608. In some embodiments, color camera 1621 and color camera 1622 attain planar images as discussed herein. In some embodiments, device 1600 does not include color camera 1621 and 1622 and device 1600 attains input image data (e.g., any input image data discussed herein) from another device. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include color cameras 1621, 1622, and a flash 1610 integrated into back 1602 (or elsewhere) of device 1600. In other examples, color cameras 1621, 1622, and flash 1610 may be integrated into front 1601 of device 1600 or both front and back sets of cameras may be provided. Color cameras 1621, 1622 and a flash 1610 may be components of a camera module to originate color image data with IR texture correction that may be processed into an image or streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for calibrating a wide-baseline outside-in multi-camera system comprises receiving a video sequence and a set of intrinsic parameters corresponding to each camera of the multi-camera system, wherein the video sequences each comprise a plurality of video frames of a scene sequenced along shared time instances across the video sequences, determining a set of extrinsic parameters for each camera and for each time instance of the video sequences by generating first extrinsic parameters based on tracked features in the video sequences, generating second extrinsic parameters using location and orientation parameters corresponding to one or more motion control systems coupled to one or more corresponding cameras of the multi-camera system, and combining the first extrinsic parameters with second extrinsic parameters to provide at least a portion of the sets of extrinsic parameters, and outputting the sets of extrinsic parameters.

In one or more second embodiments, further to the first embodiment, the first extrinsic parameters correspond to a first camera of the multi-camera system, the first extrinsic parameters generated by determining feature correspondences between first and second downsampled temporally sequential frames of a first video sequence based on feature detection between a number of overlapping blocks of the first and second downsampled sequential frames and generating at least a portion of the first extrinsic parameters using the feature correspondences.

In one or more third embodiments, further to the first or second embodiments, the number of overlapping blocks is determined based on a number of available processing threads and said feature detection is in response to the first and second downsampled sequential frames being feature detection frames that define a feature tracking interval provided between feature detection frames at a user determined frame interval.

In one or more fourth embodiments, further to any of the first through third embodiments, in response to a third downsampled sequential frame of the first video sequence being a feature tracking frame, the method further comprises globally tracking features between the second and third downsampled sequential frames to determine second feature correspondences and generating third extrinsic parameters using the second feature correspondences.

In one or more fifth embodiments, further to any of the first through fourth embodiments, the first extrinsic parameters correspond to a first camera of the multi-camera system, the first extrinsic parameters generated by determining the first camera, based on a first motion control system coupled to the first camera, has a current position and orientation within a threshold of an initialization position and orientation of the first camera and setting, in response to said determination, third extrinsic parameters for the first camera to initialized extrinsic parameters corresponding to the initialization position and orientation.

In one or more sixth embodiments, further to any of the first through fifth embodiments, the method further comprises determining a focal length for a first camera of the multi-camera system having a telephoto lens and a ground truth position in the scene based on iteratively determining a current estimated location of the first camera in the scene using a current estimated focal length and 2D-3D landmark correspondences between 2D landmarks in a frame of the scene from the first camera and 3D landmarks in the scene and comparing the current estimated location to the ground truth position and generating a next estimated focal length when a distance between the current estimated location and the ground truth position compares unfavorably to a threshold or providing the current estimated focal length as the focal length when the distance compares favorably to the threshold, wherein the next estimated focal length is within a range defined by the current estimated focal length and one of a prior estimated focal length or a maximum or minimum available focal length.

In one or more seventh embodiments, further to any of the first through sixth embodiments, the next estimated focal length is within a higher focal length range in response to the current estimated location being closer to the 3D landmarks than the ground truth position.

In one or more eighth embodiments, further to any of the first through seventh embodiments, the method further comprises generating a first set of intrinsic parameters for a first camera of the multi-camera system by receiving a reported focal length from the first camera and determining the first set of intrinsic parameters based on interpolation of the first set of intrinsic parameters from a plurality of calibrated sets of intrinsic parameters each for one of a plurality of sample focal lengths.

In one or more ninth embodiments, further to any of the first through eighth embodiments, the sample focal lengths are on a uniform reciprocal scale such that intervals between adjacent reciprocals of the sample focal lengths are substantially the same.

In one or more tenth embodiments, further to any of the first through ninth embodiments, the method further comprises generating a hand-eye transform for a first camera of the multi-camera system by transforming 3D landmark points in the scene to a camera reference frame, transforming annotated 2D landmark points for a plurality of frames attained by the first camera to normalized image coordinates, and estimating the hand-eye transform based on minimizing distances between the transformed annotated 2D landmark points in the normalized image coordinates and projections of the transformed 3D landmark points to the normalized image coordinates, wherein the projections comprise application of the hand-eye transform.

In one or more eleventh embodiments, further to any of the first through tenth embodiments, combining the first extrinsic parameters with the second extrinsic parameters comprises applying an unscented Kalman filter to the first and second extrinsic parameters based on sensor noise from the one or more motion control systems and noise from visual odometry used to generate the first extrinsic parameters.

In one or more twelfth embodiments, further to any of the first through eleventh embodiments, the unscented Kalman filter is applied based on modeling a nonlinear kinematic state transition of a first camera resulting from motion of a corresponding first motion control system and corresponding nonlinear measurements from the visual odometry.

In one or more thirteenth embodiments, a device, apparatus or system includes a memory and one or more processors to perform a method according to any one of the above embodiments. outputting the sets of extrinsic parameters comprises compressing the video sequences to one or more video streams and providing the sets of extrinsic parameters as metadata to the one or more video streams.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus to calibrate a wide-baseline outside-in moving multi-camera system, the apparatus comprising:
    memory to store at least portions of video sequences and intrinsic parameters corresponding to cameras of the multi-camera system, the video sequences including a plurality of video frames of a scene sequenced along time instances shared across the video sequences;
    computer readable instructions; and
    at least one processor circuit to be programmed by the computer readable instructions to:
        determine respective calibration parameters for corresponding ones of the cameras at corresponding ones of the time instances based on extrinsic parameters, a first one of the extrinsic parameters based on tracked features in the video sequences, a second one of the extrinsic parameters based on at least one of a location parameter or an orientation parameter corresponding to one or more motion control systems coupled to one or more of the corresponding ones of the cameras of the multi-camera system; and output at least some of the calibration parameters.

2. The apparatus of claim 1, wherein one or more of the at least one processor circuit is to:

determine feature correspondences between first and second downsampled temporally sequential frames of a first video sequence of the video sequences based on feature detection between a number of overlapping blocks of the first and second downsampled sequential frames; and generate the first one of the extrinsic parameters based on the feature correspondences, the first one of the extrinsic parameters corresponding to a first camera of the multi-camera system.

3. The apparatus of claim 2, wherein one or more of the at least one processor circuit is to:

determine the number of overlapping blocks based on a number of available processing threads; and perform the feature detection in response to the first and second downsampled sequential frames being feature detection frames that define a feature tracking interval.

4. The apparatus of claim 3, wherein, in response to a third downsampled sequential frame of the first video sequence being a feature tracking frame, one or more of the at least one processor circuit is to:

track features between the second and third downsampled sequential frames to determine second feature correspondences; and generate a third extrinsic parameter based on the second feature correspondences.

5. The apparatus of claim 1, wherein one or more of the at least one processor circuit is to:

determine, based on a first motion control system coupled to a first camera of the multi-camera system, that the first camera has at least one of a current position or a current orientation within a threshold of at least one of an initialization position or an initialization orientation of the first camera; and set a third one of the extrinsic parameters associated with the first camera to an initialized extrinsic parameter corresponding to the at least one of the initialization position or the initialization orientation.

6. The apparatus of claim 1, wherein one or more of the at least one processor circuit is to determine a focal length for a first camera of the multi-camera system having a telephoto lens and a ground truth position in the scene based on iteratively:

determining a current estimated location of the first camera in the scene based on a current estimated focal length and landmark correspondences between two-dimensional (2D) landmarks in a frame of the scene from the first camera and three-dimensional (3D) landmarks in the scene; and at least one of (i) generate a next estimated focal length when a distance between the current estimated location and the ground truth position compares unfavorably to a threshold, or (ii) provide the current estimated focal length as the focal length when the distance compares favorably to the threshold, the next estimated focal length within a range based on the current estimated focal length and at least one of a prior estimated focal length, a maximum available focal length or a minimum available focal length.

7. The apparatus of claim 6, wherein the next estimated focal length is within a higher focal length range than a prior focal length range in response to the current estimated location being closer to the 3D landmarks than the ground truth position.

8. The apparatus of claim 1, wherein one or more of the at least one processor circuit is to:

obtain a reported focal length from a first camera of the multi-camera system; and determine a first set of intrinsic parameters for the first camera based on interpolation of the first set of intrinsic parameters from a plurality of calibrated sets of intrinsic parameters corresponding respectively to a plurality of sample focal lengths.

9. The apparatus of claim 8, wherein the sample focal lengths are on a uniform reciprocal scale such that intervals between adjacent reciprocals of the sample focal lengths are substantially the same.

10. The apparatus of claim 1, wherein one or more of the at least one processor circuit is to:

transform 3D landmark points in the scene to a camera reference frame;

transform annotated 2D landmark points for a plurality of frames attained by a first camera of the multi-camera system to normalized image coordinates; and estimate a hand-eye transform for the first camera based on reducing distances between the transformed annotated 2D landmark points in the normalized image coordinates and projections of the transformed 3D landmark points to the normalized image coordinates, the projections based on application of the hand-eye transform.

11. The apparatus of claim 1, wherein one or more of the at least one processor circuit is to apply an unscented Kalman filter to the first one of the extrinsic parameters and the second one of the extrinsic parameters based on sensor noise from the one or more motion control systems and noise from visual odometry used to generate the first extrinsic parameters.

12. The apparatus of claim 11, wherein the unscented Kalman filter is based on modeling a nonlinear kinematic state transition of a first camera of the multi-camera system resulting from motion of a corresponding first one of the motion control system systems and a corresponding nonlinear measurement from the visual odometry.

13. The apparatus of claim 1, wherein one or more of the at least one processor circuit is to;

compress the video sequences to one or more video streams; and provide the extrinsic parameters as metadata to the one or more video streams.

14. A method to calibrate a wide-baseline outside-in moving multi-camera system, the method comprising:

receiving video sequence sequences and intrinsic parameters corresponding to cameras of the multi-camera system, respective ones of the video sequences including a plurality of video frames of a scene sequenced along time instances shared across the video sequences;

determining, by at least one processor circuit programmed by at least one instruction, respective calibration parameters for corresponding ones of the cameras at corresponding ones of the time instances based on extrinsic parameters, a first one of the extrinsic parameters based on tracked features in the video sequences, a second extrinsic parameters based on at least one of a location parameter or an orientation parameter corresponding to one or more motion control systems coupled to one or more of the corresponding ones of the cameras of the multi-camera system; and outputting the calibration parameters.

15. The method of claim 14, wherein the first one of the extrinsic parameters corresponds to a first camera of the multi-camera system, and further including:

determining feature correspondences between first and second downsampled temporally sequential frames of a first video sequence of the video sequences based on tracking features within a number of overlapping blocks of the first and second downsampled sequential frames; and generating the first one of the extrinsic parameters based on the feature correspondences.

16. The method of claim 14, wherein the first one of the extrinsic parameters corresponds to a first camera of the multi-camera system, and further including:

determining, based on a first motion control system coupled to the first camera, that the first camera has at least one of a current position or a current orientation within a threshold of at least one of an initialization position or an initialization orientation of the first camera; and setting a third one of the extrinsic parameters associated with the first camera to an initialized extrinsic parameter corresponding to the at least one of the initialization position or the initialization orientation.

17. The method of claim 14, further including determining a focal length for a first camera of the multi-camera system having a telephoto lens and a ground truth position in the scene based on iteratively:

determining a current estimated location of the first camera in the scene based on a current estimated focal length and landmark correspondences between two-dimensional (2D) landmarks in a frame of the scene from the first camera and three-dimensional (3D) landmarks in the scene; and at least one of (i) generating a next estimated focal length when a distance between the current estimated location and the ground truth position compares unfavorably to a threshold, or (ii) providing the current estimated focal length as the focal length when the distance compares favorably to the threshold, the next estimated focal length within a range defined by the current estimated focal length and at least one of a prior estimated focal length, a maximum available focal length or a minimum available focal length.

18. The method of claim 14, further including:

receiving a reported focal length from a first camera of the multi-camera system; and determining a first set of intrinsic parameters based on interpolation of the first set of intrinsic parameters from a plurality of calibrated sets of intrinsic parameters corresponding respectively to a plurality of sample focal lengths, the sample focal lengths on a uniform reciprocal scale such that intervals between adjacent reciprocals of the sample focal lengths are substantially the same.

19. The method of claim 14, further including:

transforming 3D landmark points in the scene to a camera reference frame;

transforming annotated 2D landmark points for a plurality of frames attained by a first camera of the multi-camera system to normalized image coordinates; and estimating a hand-eye transform for the first camera based on reducing distances between the transformed annotated 2D landmark points in the normalized image coordinates and projections of the transformed 3D landmark points to the normalized image coordinates, the projections based on application of the hand-eye transform.

20. At least one memory comprising instructions to cause at least one processor circuit to at least:

access respective video sequences and intrinsic parameters corresponding to cameras of a multi-camera system, respective ones of the video sequences including a plurality of video frames of a scene sequenced along time instances shared across the video sequences;

determine respective calibration parameters for corresponding ones of the cameras at corresponding ones of the time instances based on extrinsic parameters, a first one of the extrinsic parameters based on tracked features in the video sequences, a second one of the extrinsic parameters based on at least one of a location parameter or an orientation parameter corresponding to one or more motion control systems coupled to one or more of the corresponding ones of the cameras of the multi-camera system; and output the calibration parameters.

21. The at least one memory of claim 20, wherein the instructions are to cause one or more of the at least one processor circuit to:

determine feature correspondences between first and second downsampled temporally sequential frames of a first video sequence of the video sequences based on tracking features within a number of overlapping blocks of the first and second downsampled temporally sequential frames; and generate the first one of the extrinsic parameters based on the feature correspondences, the first one of the extrinsic parameters corresponding to a first camera of the multi-camera system.

22. The at least one memory of claim 20, wherein the instructions are to cause one or more of the at least one processor circuit to:

determine, based on a first motion control system coupled to a first camera of the multi-camera system, that the first camera has at least one of a current position or a current orientation within a threshold of at least one of an initialization position or an initialization orientation of the first camera; and set a third one of the extrinsic parameters associated with the first camera to an initialized extrinsic parameter corresponding to the at least one of the initialization position or the initialization orientation.

23. The at least one memory of claim 20, wherein the instructions are to cause one or more of the at least one processor circuit to determine a focal length for a first camera of the multi-camera system having a telephoto lens and a ground truth position in the scene based on iteratively:

determining a current estimated location of the first camera in the scene based on a current estimated focal length and landmark correspondences between two-dimensional (2D) landmarks in a frame of the scene from the first camera and three-dimensional (3D) landmarks in the scene; and at least one of (i) generating a next estimated focal length when a distance between the current estimated location and the ground truth position compares unfavorably to a threshold, or (ii) providing the current estimated focal length as the focal length when the distance compares favorably to the threshold, the next estimated focal length within a range based on the current estimated focal length and at least one of a prior estimated focal length, a maximum available focal length or a minimum available focal length.

24. The at least one memory of claim 20, wherein the instructions are to cause one or more of the at least one processor circuit to:
- obtain a reported focal length from a first camera of the multi-camera system; and
- determine a first set of intrinsic parameters for the first camera based on interpolation of the first set of intrinsic parameters from a plurality of calibrated sets of intrinsic parameters corresponding respectively to a plurality of sample focal lengths, the sample focal lengths on a uniform reciprocal scale such that intervals between adjacent reciprocals of the sample focal lengths are substantially the same.

25. The at least one memory of claim 20, wherein the instructions are to cause one or more of the at least one processor circuit to:
- transform 3D landmark points in the scene to a camera reference frame;
- transform annotated 2D landmark points for a plurality of frames attained by a first camera of the multi-camera system to normalized image coordinates; and
- estimate a hand-eye transform for the first camera based on reducing distances between the transformed annotated 2D landmark points in the normalized image coordinates and projections of the transformed 3D landmark points to the normalized image coordinates, the projections based on application of the hand-eye transform.

* * * * *